(12) United States Patent
Kondo

(10) Patent No.: US 7,447,141 B2
(45) Date of Patent: *Nov. 4, 2008

(54) INFORMATION RECORDING MEDIUM AND REPRODUCING APPARATUS THEREFOR

(75) Inventor: Tetsuya Kondo, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/675,245

(22) Filed: Feb. 15, 2007

(65) Prior Publication Data

US 2007/0140096 A1  Jun. 21, 2007

Related U.S. Application Data

(60) Continuation of application No. 11/187,963, filed on Jul. 25, 2005, now Pat. No. 7,193,958, which is a continuation of application No. 10/457,556, filed on Jun. 10, 2003, now Pat. No. 6,937,555, which is a division of application No. 09/558,069, filed on Apr. 26, 2000, now Pat. No. 6,600,716.

(30) Foreign Application Priority Data

Apr. 28, 1999  (JP)  .................. 11-121381/1999
Jun. 23, 1999  (JP)  .................. 11-176869/1999

(51) Int. Cl.
*G11B 7/00* (2006.01)
(52) U.S. Cl. ............... 369/275.3; 369/53.12; 369/275.1
(58) Field of Classification Search ............... 369/275.3
See application file for complete search history.

(56) References Cited

U.S. PATENT DOCUMENTS

| 4,688,203 A | 8/1987 | Koishi et al. |
| 4,766,502 A | 8/1988 | Mashimo |
| 4,961,077 A | 10/1990 | Wilson et al. |
| 4,989,195 A | 1/1991 | Suzuki |
| 5,155,722 A | 10/1992 | Yoshida |
| 5,518,325 A * | 5/1996 | Kahle .................. 400/70 |
| 5,537,387 A | 7/1996 | Ando et al. |
| 5,671,205 A | 9/1997 | Ledieu |
| 5,694,387 A * | 12/1997 | Gotoh et al. ............. 369/53.12 |
| 5,706,266 A | 1/1998 | Brownstein et al. |
| 5,759,332 A | 6/1998 | Itoigawa et al. |
| 5,809,003 A * | 9/1998 | Taira et al. ............... 369/275.1 |
| 5,838,653 A | 11/1998 | Fan et al. |

(Continued)

FOREIGN PATENT DOCUMENTS

JP  01-115685  5/1989

(Continued)

*Primary Examiner*—Wayne Young
*Assistant Examiner*—Van T Pham
(74) *Attorney, Agent, or Firm*—Connolly Bove Lodge & Hutz LLP

(57) ABSTRACT

An environmental load information of an information recording medium is recorded on the information recording medium so as to recycle or dispose properly an information recording medium, which is not necessary any more. The information recording medium comprises a main information area (102) for recording or reproducing information and a recording area (101) for environmental load information, which is recorded with an environmental load information of the information recording medium.

8 Claims, 13 Drawing Sheets

U.S. PATENT DOCUMENTS

| | | | |
|---|---|---|---|
| 6,002,657 | A | 12/1999 | Furukawa et al. |
| 6,219,330 | B1 * | 4/2001 | Ahn et al. ................ 369/275.1 |
| 6,449,222 | B2 | 9/2002 | Ishihara |
| 6,498,775 | B1 * | 12/2002 | Fan et al. ...................... 369/94 |
| 6,507,557 | B1 * | 1/2003 | Ohno et al. ............... 369/275.3 |
| 6,541,186 | B2 | 4/2003 | Sato et al. |
| 6,597,647 | B2 | 7/2003 | Kanno et al. |
| 6,600,716 | B1 | 7/2003 | Kondo |
| 6,618,350 | B2 | 9/2003 | Sasaki et al. |
| 6,633,853 | B2 | 10/2003 | Oshima et al. |
| 6,937,555 | B2 | 8/2005 | Kondo |
| 2005/0058039 | A1 * | 3/2005 | Kamatani ................. 369/53.2 |

FOREIGN PATENT DOCUMENTS

| | | |
|---|---|---|
| JP | 01-251342 | 10/1989 |
| JP | 01-303643 | 12/1989 |
| JP | 2-110859/1990 | 4/1990 |
| JP | 5-210873/1993 | 8/1993 |
| JP | 5-307771/1993 | 11/1993 |
| JP | 6-36512/1994 | 2/1994 |
| JP | 7-176080/1995 | 7/1995 |
| JP | 7-303873/1995 | 11/1995 |
| JP | 8-52065/1996 | 2/1996 |
| JP | 8-294677/1996 | 11/1996 |
| JP | 3034846 | 12/1996 |
| JP | 9-226737/1997 | 9/1997 |
| JP | 10-116467/1998 | 5/1998 |
| JP | 2002-307828 | 10/2002 |
| WO | WO-99/17288 | 4/1999 |

* cited by examiner

| Environmental load information [999] | PRODUCT [100] | Main Material [101] | Polycarbonate |
| | | Category Code of Main Material [102] | P-5 |
| | | Sub Material [103] | Acrylic Resin |
| | | Category Code of Sub Material [104] | C-1 |
| | RECYCLE [200] | Recycling Method (for end user) [201] | Transfer to JDRC |
| | | Division Code for Recycle (for end user) [202] | R-D1 |
| | | Recycling Method (for treater) [203] | Molten |
| | | Division Code for Recycle (for treater) [204] | D1-PC |
| | ABANDON [300] | Abandon Method (for end user) [301] | Incineration |
| | | Division Code for Abandon (for end user) [302] | P-1 |
| | | Abandon Method (for treater) [303] | B-P1 |
| | | Division Code for Abandon (for treater) [304] | P-1 |
| | | Environmental Pollution Coefficient at Best Disposing [305] | 1 |
| | | Environmental Pollution Coefficient at Disposing by Incineration [306] | 1 |
| | PROCESS [400] | Intermediate [401] | Nickel |
| | | Intermediate [402] | Soda lime Glass |
| | | Raw Material [403] | Nickel Sulfamate |
| | | Raw Material [404] | PGMEA |
| | | Environmental Pollution Coefficient at Manufacturing [405] | 0.1 |

*Fig. 17*

| ELI | 101 | PC |
| --- | --- | --- |
| | 102 | P-5 |
| | 103 | ARC |
| | 104 | C-1 |
| | 201 | JDRC |
| | 202 | R-D1 |
| | 203 | MELT |
| | 204 | D1-PC |
| | 301 | BURN |
| | 302 | P-1 |
| | 303 | B-P1 |
| | 304 | P-1 |
| | 305 | 1 |
| | 306 | 1 |
| | 401 | NI |
| | 402 | SLG |
| | 403 | SSNI |
| | 404 | PGMEA |
| | 405 | 0.1 |

*Fig. 18*

INFORMATION RECORDING MEDIUM AND REPRODUCING APPARATUS THEREFOR

This application is a Continuation of application Ser. No. 11/187,963 filed Jul. 25, 2005 (now allowed); which is a Continuation of application Ser. No. 10/457,556, filed on Jun. 10, 2003 (now U.S. Pat. No. 6,937,555); which is a Divisional of application Ser. No. 09/558,069, filed on Apr. 26, 2000 (now U.S. Pat. No. 6,600,716), and for which priority is claimed under 35 U.S.C. § 120; and this application claims priority of application Ser. No. 11-121381/1999 filed in Japan on Apr. 28, 1999 and application Ser. No. 11-176869/1999 filed in Japan on Jun. 23, 1999; under 35 U.S.C. § 119; the entire contents of all are hereby incorporated by reference.

BACKGROUND OF THE INVENTION

1. Field of the Invention

The present invention relates to an information recording medium and a reproducing apparatus therefor, particularly, relates to a information recording medium such as an optical disk, a magnetic disk, an optical card, a magnetic card, an IC card, a magnetic tape and an optical tape, and a reproducing apparatus for such information recording medium.

2. Description of the Related Art

Currently there existed various kinds of information recording mediums recorded with information, which can be read out optically, magnetically and electronically. A production quantity of such information recording mediums is increasing year by year in conjunction with progress of information society.

In contrast to diffusion of an information recording medium, a quantity of mediums, which are not necessary after use, is surely increasing. From a viewpoint of protecting the global environment, these mediums not necessary must be disposed properly or recycled. However, they are almost not properly disposed or recycled. They create problems such as environmental pollution by illegal abandonment of them, waste of limited global resources and the global heat-island phenomenon caused by destroying them by fire. Such problems seriously affect life on the earth, if the problems are not solved shortly. In a worst case, human beings can not survive any more.

SUMMARY OF THE INVENTION

Accordingly, in consideration of the above-mentioned problems of the current situation, an object of the present invention is to provide an information recording medium additionally recorded with an environmental load information, which is an information about affection to the global environment caused by the information recording medium and directly recorded on the information recording medium while manufacturing. The method of additionally recording the environmental information utilizes a recording function, which is essentially inherent to an information recording medium. Since an environmental load information recorded on an information recording medium can be read out easily by an end user when he takes the information recording medium, the information recording medium can be properly disposed or recycled when the information recording medium is not necessary any more. Accordingly, the global environment can be protected.

Further, some cases such that an environmental pollution is provoked by an incorrect method of disposing or impurities are increased by an incorrect recycling method, can be eliminated. The environmental load information can also be utilized for dividing information recording mediums to be disposed when a treater of recycling or disposing receives them as well as for referring it by an end user.

Nevertheless, there existed another technical problem. Almost all information recording mediums are simple in configuration. However, all areas of a medium are allocated to a recording material, an auxiliary material for recording, a guide for recording and a guide for reproducing. Therefore, no area is allocated exclusively to an environmental load information. Accordingly, a part of main information recording area is assigned for an area for recording the environmental load information. It can be applicable for an information recording medium having a large recording capacity. However, it can not be applied for an information recording medium having a smaller recording capacity. Further, there is no excellent method for an information capacity not to be reduced. If a label inscribed with an environmental load information is affixed on a surface of an information recording medium, a recording capacity, which can be reproduced, decreases. In a worst case, the label affixed on the information recording medium may warp the medium itself and creates a further problem such that the information recording medium can not be reproduced. In addition thereto, there existed a furthermore problem that a reproducing apparatus to reproduce the environmental load information is not existed.

In order to achieve the above object, the present invention provides, according to an aspect thereof, an information recording medium, which comprises an information recording area provided for recording and/or reproducing, an identification (ID) information recording area recorded with an ID information of the information recording medium, wherein the ID information recording area is allocated in a circular arc on a circumference of a predetermined radius provided outside an inner circumference side of the information recording area and a recording area for environmental load information recorded with a product manufacturing information related to the information recording medium, wherein the recording area for environmental load information is provided on the circumference without overlapping with the ID information area.

According to another aspect of the present invention, there provided an information recording medium, which comprises an information recording area provided for recording and/or reproducing, an identification (ID) information recording area recorded with an ID information of the information recording medium, wherein the ID information recording area is allocated in a circular arc on a circumference of a predetermined radius provided outside an inner circumference side of the information recording area and a recording area for environmental load information recorded with a product manufacturing information related to the information recording medium, wherein the recording area for environmental load information is provided on a reading out surface for information of the information recording medium and provided on the circumference without overlapping with the ID information area with viewing from the reading out surface side. According to further aspect of the present invention, there provided a reproducing apparatus for reproducing an information recording medium mentioned in above aspects. The reproducing apparatus comprises reproducing means for reproducing the environmental load information recorded in one area of a lead-in area, a lead-out area and the information recording area.

Other object and further features of the present invention will be apparent from the following detailed description when read in conjunction with the accompanying drawings.

BRIEF DESCRIPTION OF DRAWINGS

FIG. 17 is an exemplary record of an area recorded with an environmental load information.

FIG. 18 is another exemplary record of an area recorded with an environmental load information.

DETAILED DESCRIPTION OF THE PREFERRED EMBODIMENTS

Figure 1:
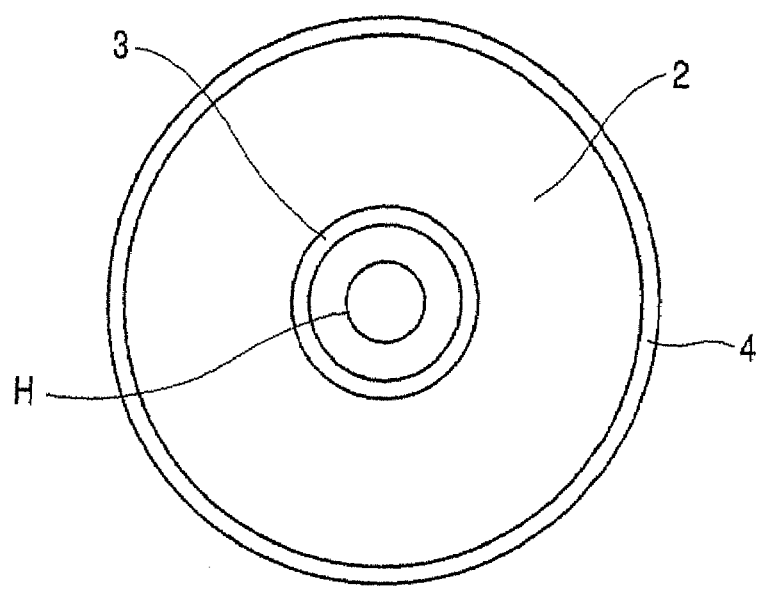
FIG. 1 shows an appearance of a usual optical disk as an information recording medium according to the prior art.

Prior to depict each embodiment, an information recording medium in accordance with the present invention, an environmental load information, a recording position of the environmental load information and its recording method and a reproducing apparatus for the information recording medium in accordance with the present invention are described first in general.

According to an aspect of the present invention, there provided a first information recording medium comprising an information recording area or a main information recording area for recording or reproducing main information and a recording area for environmental load information, which is recorded with an environmental load information of the first information recording medium. The recording area for environmental load information is provided with a recording layer composed of a material, which can be reproduced by utilizing at least one change of light, magnetism, electrostatic capacitance or electrical resistance.

According to another aspect of the present invention, there provided a second information recording medium, wherein an environmental load information of the second information recording medium is recorded inside an information recording area or a main information recording area. The environmental load information is recorded on a signal track, that is, an array of pits in the main information recording area with being dispersed or superimposed. In other case, the environmental load information is recorded in a lead-in area or a lead-out area of the information recording medium.

Further, the environmental load information is at least one information about a material of composing the first or second information recording medium, a category code of the material, a reprocessing method, a disposing method, an environmental pollution coefficient when disposing, an intermediate when manufacturing and an environmental pollution coefficient when manufacturing.

With respect to a first and second information recording mediums, a disk shaped read only optical disk such as a CD (Compact Disk) and a DVD (Digital Versatile Disk) is utilized for easier explanation. However, a recording/reproducing type optical disk such as an MD (Mini Disk), an MO (Magneto-Optical) disk, an HS (Hyper Storage) disk, a GIGAMO (GIGA-byte Magneto-Optical) disk, an ASMO (Advanced Storage Magneto-Optical) disk, a PD (Photo Disk), a DVD-RAM (Digital Versatile Disk-Random Access Memory), a CD-R (Compact Disk-Recordable), a DVD-R (Digital Versatile Disk-Recordable), a DVD-RW (Digital Versatile Disk-ReWritable) and a DVD+RW (Digital Versatile Disk+ReWritable) can also be applied. In addition thereto, a magnetic disk, an optical card, a magnetic card, an IC card, a magnetic tape and an optical tape can also be applied as well.

An environmental load information, which is recorded on an information recording medium in accordance with the present invention, is selected from following 4 information (1) through (4). All or a part of them is recorded as the environmental load information.

(1) Material information related to product, which is an information about main and sub materials. For example, polycarbonate is a main material utilized for a transparent substrate of an optical disk and acrylic hardening paint is a sub material for a protection layer of an optical disk. A third and fourth materials can also be: described if necessary. In a case of a read only optical disk, for example, aluminum utilized for a recording layer of the optical disk can be described as a third material. In a case of a phase change type recording/reproducing disk as an example of recording/reproducing type optical disk, Te (tellurium), Sb (antimony) and Ge (germanium) can be described as a third, fourth and fifth materials respectively. In a case of a magneto-optical recording/reproducing disk, Tb (terbium), Fe (iron) and Co (cobalt) can be described as a third, fourth and fifth materials respectively. An indicating name of these materials and listing of these materials can be arbitrarily decided by each manufacturer or followed by a standard defined by an official facility. It is desirable that an order of listing is decided by a volume of a component. However, it is desirable that a material having a larger environmental load when utilized, a highly toxic material and a material including a component of a larger environmental load when disposed shall be ranked higher although they are an extremely small quantity. A category code of material shall be described herewith. Materials mentioned above shall be described by category in accordance with a predetermined standard. Category codes defined by an official facility can also be utilized.

(2) Recycling information, which is an information about recycling or reusing a product. The recycling information is described such that throw it into a recycle box or a reuse box installed in a park, a railway station, a convenience store, a super market, a CD shop or an electric appliance store, send it to a processing center, or leave it to a rubbish gatherer going round a town regularly or non-regularly. Further, a division code for recycling shall be described together with the recycling information. A method of recycling mentioned above shall also be described with classifying in accordance with a predetermined standard. A code defined by an official facility can also be utilized. These processing methods and codes can be defined separately for an end user and for a rubbish gatherer, and then described on a product. With respect to a processing method for a rubbish gatherer, it is a most desirable that a detailed method such as grinding into pieces or melting is described, and that its processing conditions such as time duration, a degree of pH and a temperature are also described.

(3) Abandoning information, which indicates a method of abandoning a product without recycling or reusing it. For example, a processing method such that the product is incinerated or the product is decomposed naturally by burying it in the earth, by efflorescing it or by dispersing it into a river or sea is described. A division code for abandon is necessary in conjunction with a method of abandoning. The division code for abandon shall be classified such as flammable resin, flame-retardant resin, high temperature generating resin, greenhouse effect gas generating resin, dioxin generating resin, internal secretion disturbing chemical generating resin, groundwater polluting resin and biodegradability resin. Further, most suitable conditions such as temperature and time duration for processing shall be described. These information can be defined separately for an end user and for a rubbish gatherer, and then described on a product. Furthermore, it is more desirable to describe an environmental pollution coefficient. In addition thereto, it is further desirable to describe a coefficient when processed most properly and a coefficient when incinerated separately. The environmental pollution coefficient when processed most properly is an influence upon environment, which is generated when processing in accordance with a most proper processing method, indicated by an index number. The environmental pollution coefficient is calculated totally or individually from each quantity such as, for example, generated heat quantity, generated carbon dioxide quantity, generated methane gas quantity, generated vapor quantity, generated nitrogen oxide quantity, generated dioxin quantity and ozone layer depleting quantity and described on a product. The environmental pollution coefficient when incinerated is an influence upon environment, which is generated when disposed by an end user with a smaller incinerating furnace for home use, school use or park use, for example, and is indicated by an index number. The environmental pollution coefficient is calculated totally or individually from each quantity such as, for example, generated heat quantity and generated carbon dioxide quantity as well. An index number defined by an official facility can also be utilized.

(4) Product manufacturing information, which describes a name of intermediate and an influence upon environment when the product is manufactured. An intermediate is a component or a part, which temporarily appears during manufacturing processes and does not appear in a final product. All or main intermediates shall be described. For example, such materials as Ni (nickel) for a stamper and soda lime glass for a glass master are intermediates. It is desirable to describe raw materials utilized during manufacturing process together with intermediates. All or main raw materials being added during manufacturing processes shall be described. For example, nickel sulfamate and boric acid, which are utilized for manufacturing a stamper, and cresol novolac and solvent, which are utilized for manufacturing a glass master, are raw materials. Main materials mentioned in the paragraph (1) above can be described once again herewith. These materials can be described in accordance with a manufacturing process chart defined by the ISO 14001, for example. Further, it is desirable to describe an environmental pollution coefficient accompanying a manufacturing process. Product manufacturing information such as materials added during a manufacturing process, amounts of consuming electric power and water and air, numerical values of exhausting by-products and heat and gas, and an influence upon environment calculated from these additives and waste are described. Codes defined by an official facility can be described as product manufacturing information.

Since this product manufacturing information is related to factory information of a manufacturer, it is desirable to describe a name or a code specifying the manufacturer and relating information altogether. Such information is selected from information such as name of a factory, name of a responsible person, country of manufacturing, full or a part of address of manufacturing, telephone number, facsimile number, URL of home page and e-mail address, and then recorded. A factory name can be expressed by a code or a logo registered in the International Federation of the Phonographic Industry (IFPI) and a country of manufacturing can be expressed by a numerical value or a character array regulated by the ISO 3166. Further, it is desirable to record manufacturing devices in a factory such as a type number of a device utilized for mastering and a type number of a device utilized for molding altogether. These information about a manufacturer are effective for clarifying a product liability (PL) of the manufacturer. Further, since these information can have another advantage of proofing the product as a genuine one if a forgery is circulated in a market, so that it is desirable to describe these information as far as possible. Furthermore, a company name of consigning production and a company name of producing contents can also be described herewith. It is rather desirable to describe them. It is further desirable to select from and describe information about the company of consigning production and producing contents such as name of responsible person, full or a part of address, telephone number, facsimile number, URL of home page and e-mail address.

These environmental load information can be described in various forms. They can be expressed, for example, in a table, a text or a still picture caricatured for easier understanding. It is also acceptable to record them by moving pictures such as in a commentary program of TV broadcasting, in animation or a finger language even sound and music. Animation and a finger language can be understandable for end users and a table can be usable for treater of recycling and disposing.

FIG. 17 is an exemplary record in a table format recorded with an environmental load information. In this case, a CD disk represents an optical disk and the environmental load information is recorded on one surface of the CD disk.

As shown in FIG. 17, an index number is described together with information so as to recognize the environmental load information easier. An index number [999] is assigned to the environmental load information. Each information composing the environmental load information is formed in a hierarchical configuration. The environmental load information [999] is divided into 4 categories such that the "(1) Material information related to product", mentioned above, is assigned to "PRODUCT [100]", "(2) Recycling information" is "RECYCLE [200]", "(3) Abandoning information" is "ABANDON [300]" and "(4) Product manufacturing information" is "PROCESS [400]". Each information is composed of several items and linked to related information corresponding to the items. Accordingly, a person utilizing the information can make access to an answer easily with searching an item to know sequentially in a hierarchical order.

In the case of "RECYCLE [200]", it is divided into 4 items: "Recycling Method (for end user) [201]", "Division Code for Recycle (for end user) [202]", "Recycling Method (for treater) [203]" and "Division Code for Recycle (for treater) [204]". Corresponding to each item there provided information codes such as "Transfer to JDRC", "R-D1", "Molten" and "D1-PC". Although, these codes are defined imaginarily for explanation, for example, "JDRC" stands for "Japan Disk Recycle Center", the "R-D1" stands for "Recycle Disk type 1", the "Molten" means that a disk is molten by a high temperature processing and the "D1-PC" means "Disk type 1-polycarbonate and relating plastics".

In a case that a user desires to dispose a CD disk for recycling, the user refers the "Recycling Method (for end user) [201]" in the "RECYCLE [200]" first, and then refers the "Division Code for Recycle (for end user) [202]". The user can recognize that the disk shall be transferred to JDRC for recycling and a division code for recycling is "R-D1". As a result, the user can notice the division code "R-D1" when the disk is transferred to the JDRC. Accordingly, the JDRC can apply a best recycling method in accordance with a product without reconfirming recycling information one by one.

Further, in a case that a waste treater disposes such a CD disk without recycling, the waste treater refers an "Abandon Method (for treater) [303]" in the "ABANDON [300]" first, and then refers to a "Division Code for Abandon (for treater) [304]". The waste treater can recognize that an abandon method is "B-P1" and a division cord for abandon is "P-1". Although, these codes are defined imaginarily for explanation, for example, the "B-P1" means "for Burning up Plastic type 1" and the "P-1" means a "wide use Plastic type 1". As a result, the waste treater can clarify a disposing method such that the CD disk having the division code "P-1" is processed by the abandon method "B-P1". Accordingly, a best abandon method can be applied in accordance with the CD disk.

FIG. 18 is an indication format of the environmental load information shown in FIG. 17, which is compactly coded for easier recording on an optical disk. An index number mentioned above and corresponding item are standardized, so that a reproducing apparatus of reproducing the environmental load information and a personal computer connected to the reproducing apparatus can conveniently utilize the environmental load information, if they store a collation table of an index number and corresponding item. For example, the environmental load information mentioned above is abbreviated to "ELI". Further, index numbers "101" through "104" are respectively equivalent to "Main Material [101]", "Category Code of Main Material [102]", "Sub Material [103]" and "Category Code of Sub Material [104]" in the "PRODUCT [100]" shown in FIG. 17. Index numbers "201" through "204" are respectively equivalent to the "Recycling Method (for end user) [201]", the "Division Code for Recycle (for end user) [202]", the "Recycling Method (for treater) [203]" and the "Division Code for Recycle (for treater) [204]" in the "RECYCLE [200]" shown in FIG. 17. Index numbers "301" through "306" are respectively equivalent to "Abandon Method (for end user) [301]", "Division Code for Abandon (for end user) [302]", the "Abandon Method (for treater) [303]", "Division Code for Abandon (for treater) [304]", "Environmental Pollution Coefficient at Best Disposing Method [305]" and "Environmental Pollution Coefficient at Disposing by Incineration [306]" in "ABANDON [300]" shown in FIG. 17. Index numbers "401" through "405" are respectively equivalent to "Intermediate [401]", "Intermediate [402]", "Raw material [403]", "Raw Material [404]" and "Environmental Pollution Coefficient at Manufacturing [405]" in "PROCESS [400]" shown in FIG. 17. In addition thereto, polycarbonate and acrylic resin are abbreviated to "PC" and "ARC" respectively. The table shown in FIG. 18 is composed of 121 characters, so that it can be recorded by approximately 1 kB (kilobyte).

A recording position of the environmental load information and its recording method are depicted by a case that a part of a main information recording area of an optical disk is assigned to the environmental load information. Prior to an explanation of recording position and method, a configuration of current optical disk of which a sectional configuration is common to various disk type information recording mediums is explained.

Figure 2:
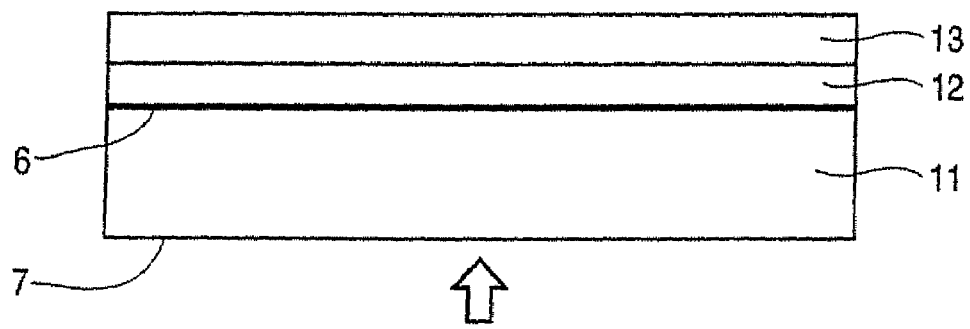
FIG. 2 is a sectional view of an optical disk having a basic sectional configuration, which is common to optical disks shown in FIGS. 1, 3 and 4.
Figure 3:
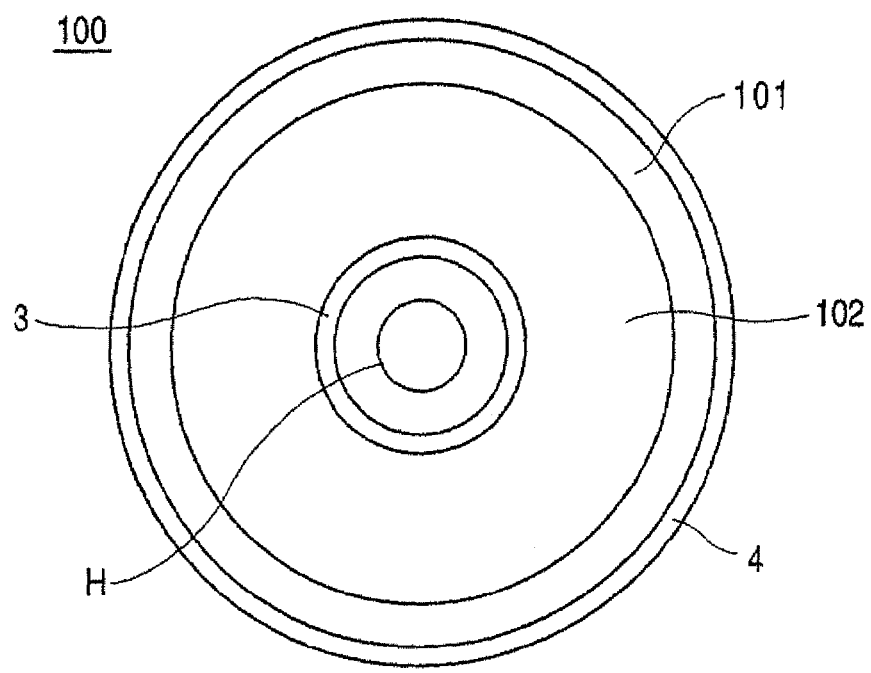
FIG. 3 shows an appearance of an optical disk as an information recording medium according to a first embodiment of the present invention.
Figure 4:
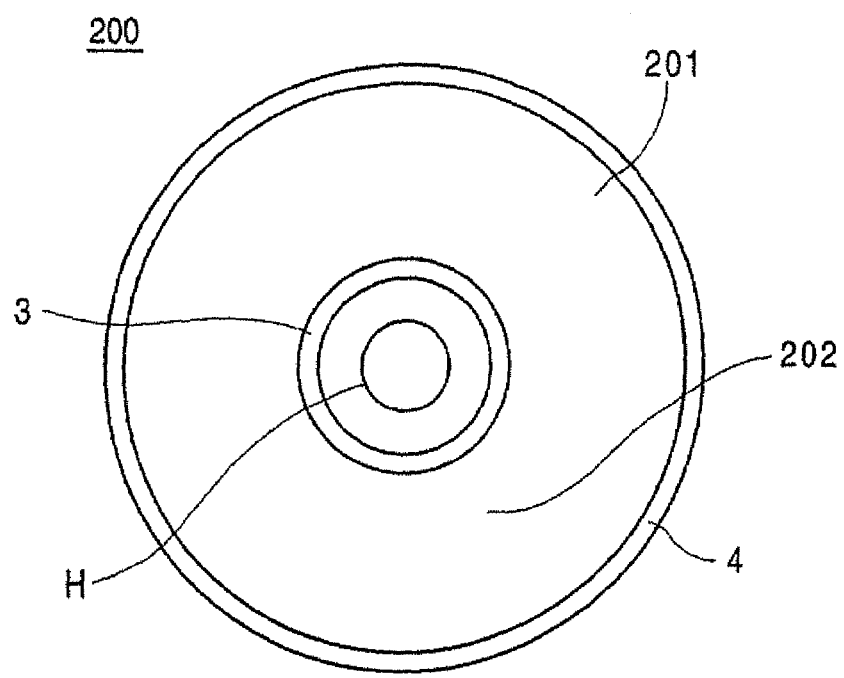
FIG. 4 shows an appearance of an optical disk as an information recording medium according to a second embodiment of the present invention.

FIG. 2 is a sectional view of an optical disk, which is a basic sectional configuration common to optical disks shown in FIGS. 1, 3 and 4. A usual optical disk is composed of such a configuration as shown in FIG. 2. In FIG. 2, the sectional configuration comprises an information recording surface 6, a reading out surface 7, a substrate 11, a recording layer 12 and a protection layer 13. As shown in FIG. 2, the substrate 11 and the recording layer 12 and the protection layer 13 are sequentially laminated. The information recording surface 6 engraved with a fine pattern or a signal track is formed on a surface, which is facing toward the recording layer 12, of the substrate 11. In a case of a read only optical disk, a pit pattern is formed on the information recording surface 6. In a case of a recording/reproducing type optical disk, a groove pattern and/or a pit pattern is formed on the information recording surface 6. The recording layer 12 is made of single layer of aluminum, in a case of a read only optical disk. However, in a case of a recording/reproducing type optical disk, the recording layer 12 is usually composed of plural layers. In almost all usual optical disks, an optical pickup not shown is allocated at a side of an interface between the substrate 11 and air. In other words, an optical pickup not shown is allocated under the substrate 11 in FIG. 2. Accordingly, the interface is called the reading out surface 7.

FIG. 1 shows an appearance of a usual optical disk, which is a view from the reading out surface 7 shown in FIG. 2. Since the substrate 11 is a transparent plate, the information recording surface 6 can be seen through the substrate 11. The information recording surface 6 comprises a plurality of areas such as a lead-in area 3, a main information area 2 and a lead-out area 4, which are sequentially allocated from a center hole "H" to an outermost circumference of the usual optical disk. Some information selected from a type of the disk, an information related to a title and a table of contents and an index recorded in the main information area 2, and another information related to a time table are recorded in the lead-in area 3. Contents such as a music information, a video information and a computer program are recorded as a main information in the main information area 2. Further, a signal, which shows that the main information area 2 is completed, is repeatedly recorded in the lead-out area 4. In addition thereto, the optical disk shown in FIG. 1 is a type of disk, which is recorded and reproduced from an innermost circumference to an outermost circumference. In a case of another type of disk, which is recorded and reproduced from an outermost circumference to an innermost circumference, the lead-in area 3 and the lead-out area 4 are reversely allocated as well.

First Embodiment

In a case of recording the environmental load information mentioned above in a usual optical disk having the configuration shown in FIGS. 1 and 2, a part of the main information area 2 in the information recording surface 6 is reduced and a part of the reduced area can be provided for an area of recording the environmental load information. In other words, an area for environmental load information can be provided in the main information area 2 arbitrarily.

FIG. 3 shows an appearance of an optical disk, which is a view from the reading out surface 7 shown in FIG. 2, as an information recording medium according to a first embodiment of the present invention. In FIG. 3, an optical disk 100 comprises a recording area 101 for environmental load information, a main information area 102, a lead-in area 3, a lead-out area 4 and a center hole "H". The recording area 101 is provided within the main information area 102. The lead-in area 3, the main information area 102, the recording area 101 and the lead-out area 4 are sequentially allocated from the center hole "H" to an outermost circumference of the optical disk 100. Accordingly, the information recording surface 6 is formed.

The optical disk 100 basically has the same configuration as that of the usual optical disk shown in FIG. 2. The optical disk 100 is an optical disk having a substrate 11, a recording layer 12 and a protection layer 13 laminated together with in order as shown in FIG. 2. In a case of recording the environmental load information mentioned above on such the optical disk 100, the recording area 101 for environmental load information can be arbitrarily provided on the optical disk 100. However, it is desired to provide the recording area 101 in an ending area of the main information area 102 preceding the lead-out area 4 as shown in FIG. 3 for convenience. In other words, a necessity of disposing or recycling an optical disk usually happens at a time when contents of the optical disk have been utilized completely. Such the recording area 101 for environmental load information can be recorded in a format of being continuously reproduced immediately after contents recorded in the main information area 102 have been utilized or in a format of being reproduced immediately after the optical disk has been loaded in a reproducing apparatus. Further, the recording area 101 for environmental load information can be recorded in a format of being reproduced arbitrarily selectable by providing a separate index. An environmental load information to be recorded can be applicable to recording a wide range of formats such as a text format and a television (TV) program format. It is rather suitable for recording a format in a large capacity such as a news commentary of a TV program, animation and talking with hands, that is, a format including video images. In a case that an optical disk is a DVD disk, a usual optical disk can record information in the main information area 102 for 133 minutes. However, in a case of the optical disk 100, according to an aspect of the present invention, the recording time of 133 minutes is assigned to the main information area 102 for 130 minutes and the recording area 101 for environmental load information for 3 minutes. It is not necessary for the main information area 102 and the recording area 101 for environmental load information to unify a physical format such as a signal system, a linear recording density and a track pitch. In a case of a same physical format, an environmental load information can be reproduced immediately after contents recorded in the main information area 102 have been utilized, so that it is rather convenient. In consideration of recording and reproducing systems, different physical formats can also be acceptable. In a case of a hybrid type recording/reproducing disk, an innermost (or an outermost) circumference area is formed with pits and an area covering from an intermediate to an outermost circumference area (or from an innermost to intermediate circumference area) is formed with grooves. The former area is assigned to a read only area and the latter area is assigned to a recording/reproducing area respectively. Accordingly, the former area can be assigned to the recording area 101 for environmental load information and the latter area to the main information area 102. The recording layer 12 shown in FIG. 2 equivalent to the recording area 101 for environmental load information is composed of a material having a capability of being reproduced by utilizing at least one change of light, magnetism, electrostatic capacitance and electric resistance. Accordingly, an environmental load information recorded on the recording layer 12 can be reproduced by one of an optical pickup, a magnetic head, an electrostatic sensor and an electrode. The material of the recording layer 12 corresponding to the recording area 101 for environmental load information can be composed of a same material as the recording layer 12 corresponding to the main information area 102.

A disk in a large capacity is a disk such as a DVD disk having a capacity of 4.7 GB per single face, 8.5 GB or 9.4 GB per double faces and 17 GB per quadri-faces and a high density optical disk having a capacity of 8 to 30 GB and being reproduced by utilizing a light source of 350 through 550 nm. However, an optical disk in a small capacity such as a CD and MD disks can be utilized if a contents supplier permits. In a case of applying to a CD disk, a CD-V (Compact Disk-Video), for example, can be utilized. According to the CD-V Specifications, an area from an innermost to an intermediate circumference area is specified as a regular music CD and an outermost circumference area is assigned to video images. Accordingly, the former area can be assigned to the main information area and the latter area to the recording area 101 for environmental load information. Further, a CD extra disk can also be utilized. According to the CD extra Specifications (Blue Book), an area from an innermost to an intermediate circumference area is specified as a regular music CD and an outermost circumference area is assigned to CD-ROM data.

Accordingly, the former area can be assigned to the main information area 102 and the latter area to the recording area 101 for environmental load information.

Thereupon, in a case of a high density optical disk utilizing a light source of 350 to 550 nm for reproduction, it is desirable for the recording area 101 for environmental load information that the recording area 101 is recorded with a format of being reproduced by a DVD reproducing apparatus. If the recording area 101 is recorded with a DVD signal, for example, the environmental load information can be reproduced by a DVD reproducing apparatus as well as a reproducing apparatus for a high density optical disk utilizing a light source of 350 to 550 nm for reproduction. Accordingly, such the environmental load information can be widely utilized although a reproducing apparatus for a high density optical disk is not commonly available.

Second Embodiment

FIG. 4 shows an appearance of an optical disk as an information recording medium according to a second embodiment of the present invention.

There exist another method of recording an environmental load information on the information recording surface 6 without reducing a capacity of the main information area 2 substantially. A configuration of such an optical disk is an optical disk 200 as shown in FIG. 4. The configuration of the optical disk 200 is different from that of the optical disk 100 shown in FIG. 3. In FIG. 4, the optical disk 200 comprises a recording area 201 for environmental load information, a main information area 202, a lead-in area 3, a lead-out area 4 and a center hole "H". The recording area 201 for environmental load information overlaps with the main information area 202, that is, an environmental load information is recorded throughout the main information area 202 with scattering the environmental load information. In other words, in consideration of that shortage of data bit occurs during a data compression process or data processing of a digital recording in general, there exist a blank area, which can be changeable, although it is in a small capacity. Further, there exist another blank area, for example, a specific blank area in a sub code, which is provided for a future use, although it is in a small capacity. A null data, that is, a series of zeros is recorded in these blank areas. These blank areas, which are a number of specific areas, exist throughout the main information area 202, so that an environmental load information can be scattered into these blank areas and recorded. A predetermined start bit is recorded at a head of each data and then data having the start bit are sequentially read out while reading out the data. A format in a small to medium capacity such as a format of recording in a table format or an audio and music format is suitable for an environmental load information to be recorded. In a case of a DVD disk, the main information area 202 is called a data zone. There exist one byte of a reserved area (b28) provided for a future use in an identifier sector in a data sector of the data zone. The reserved area can be utilized for recording an environmental load information. In addition thereto, a cross sectional configuration of the optical disk 200 is the same as that of the optical disk 100 and the usual optical disk as shown in FIG. 2.

Third Embodiment

There exist further method of recording an environmental load information, which overlaps the environmental load information on contents (main information) recorded in the main information area 202 as mentioned above. A configuration of such an optical disk is the same as that of the optical disk 200 shown in FIG. 4. In a case that a main information is analog data, the environmental load information is recorded as digital data with placing the environmental load information upon the main information. In a case that the main information is digital data, the environmental load information is recorded as analog data with placing the environmental load information upon the main information. Since a digital data has an inherent clock frequency, by using a selector or separator circuit commonly available mixed analog and digital data can be separated and reproduced individually. Particularly, in a case that a main information is digital data and an environmental load information is put upon the main information as analog data, it is a most desirable case of least loss of information volume.

Figure 5:
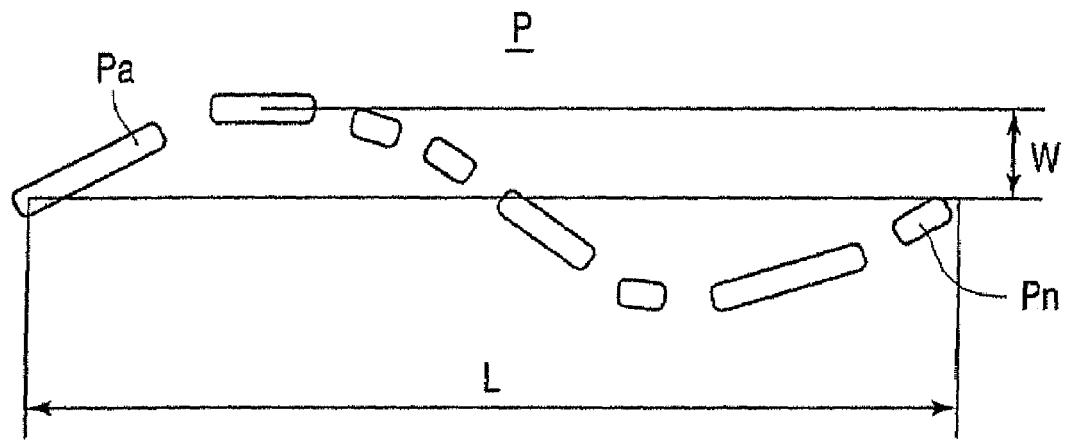
FIG. 5 shows a pit array on a surface of information recording area with placing an environmental load information upon an original information according to a third embodiment of the present invention.

FIG. 5 shows a pit array "P" on a surface of main information area with placing an environmental load information upon an original information or a main information according to a third embodiment of the present invention. As shown in FIG. 5, a main information is recorded as an array of fine pits Pa through Pn. A length of each pit represents a digital signal. On the other hand, an environmental load information is recorded as macroscopic distortion of a pit array of the main information. In FIG. 5, the pit array "P" of the main information is distorted as a sinusoidal wave form having an amplitude "W" and a period "L" and a signal, which is extracted from the distortion, is generated. Since a distortion can be approximated by a wave, an analog signal can be produced by detecting a change of either the period "L" or the amplitude "W" or changes of both the period "L" and the amplitude "W". The analog signal may be processed through an analog to digital conversion, if necessary. Accordingly, the environmental load information can be extracted as a digital format. A format in a small to medium capacity such as a format of recording in a table format or an audio and music format is suitable for an environmental load information to be recorded.

There exist furthermore method of recording an environmental load information, which puts the environmental load information in digital data upon a main information in digital data. When a pit array of main information is recorded, the main information area is prepared for recording the pit array in both higher recording power (level) and lower recording power (level). An environmental load information is digitally coded, and signals "1" and "0" are assigned to two levels respectively and recorded. Accordingly, there exist two areas; one is recorded with higher recording power and the other is recorded with lower recording power. Since output levels of these two areas are different from each other when reproduced, an output change can be observed. In a case that the output change is recorded in a lower frequency, it is observed as an envelope shift. In a case that the output change is recorded in a higher frequency, it is observed as an asymmetry shift. These shifts can be isolated through a filter, so that they can be separated from a main signal of the main information. Further, those shifts can be identified as signals "1" and "0" by a discriminator, so that a digital code can be extracted. Accordingly, an environmental load information can be put as digital data upon a main information in digital data.

In these overlapping methods such as the distortion of pit array, the envelope shift and the asymmetry shift mentioned above, unevenness on an optical disk could be recognized if the disk is viewed after the disk has been recorded by an overlapping method. Accordingly, a letter or a character can be intentionally recorded as visible unevenness on an optical disk by utilizing a part of or whole the information recording surface 6. It is also possible to record such letters of "Incombustible dust" or a character of "Δ7", which can be read out by an optical method, as an environmental load information by utilizing the information recording surface 6 of the optical disk 200. In a case that a minimum recognizing size, for example, a font size is more than 0.5 mm square, preferably more than 1 mm square, further preferably more than 2 mm, it can be recognized by eyes without utilizing an inherent reproducing apparatus.

Fourth Embodiment

No inherent drawing is provided for the fourth embodiment.

The lead-in area 3 and the lead-out area 4 can also be utilized for recording an environmental load information. There exist some fixed blank areas, which are provided for a future use in these lead-in area 3 and lead-out area 4, although they are in a small capacity. A null data, that is, a series of zeros is recorded in these blank areas. However, an environmental load information can be recorded in these blank areas. In a case of the lead-in area 3, for example, a text format can be recorded in the lead-in area 3. In a case of the lead-in area 3 of a DVD disk, there exist a zone, which is called the control data zone comprising 192 blocks (sector number 02F200h through 02FE00h) composed of 16 physical sectors per each block. The control data zone comprises one physical sector of the zone for physical format information, one physical sector of the zone for disk manufacturing information and 14 physical sectors of the zone for publisher's information. However, the zones for manufacturing information and publisher's information are actually not utilized, so that a part of these zones can be utilized for recording an environmental load information. Accordingly, for example, material information and product manufacturing information related to a product in accordance with the present invention can be recorded in the zone for disk manufacturing information. Further, for example, recycling information and abandoning information in accordance with the present invention can be recorded in the zone for publisher's information. In 2048 bytes of the zone for physical format information, there provided a reserved area, which is divided into two areas composed of 17th through 31st byte and 32nd through 2047th byte respectively. The reserved area is usually filled with a null data, so that the reserved area can be utilized for recording an environmental load information in accordance with the present invention.

In a case of a CD disk, according to the CD text Specification, a letter can be written into the lead-in area. 6000 alphanumeric letters are provided for text data. Accordingly, the lead-in area of a CD disk can also be applied for recording an environmental load information.

Furthermore, in a case of the lead-out area 4, since the lead-out area 4 is a residual capacity of the main information area 2, it can widely be applicable for recording a text format and recording a format of a TV program. In addition thereto, information necessary to lead-in or lead-out is recorded in the lead-in area 3 or lead-out area 4 several times repeatedly, so that an environmental load information can be applied to a vacant area, which is produced by reducing a number of times repeating.

Fifth Embodiment

In a case of a CD disk and a DVD disk, there exist an engraving area or a recording area for identification (ID) information, which is allocated approximately in parallel to the lead-in area 3, wherein a title number of the disk or like is engraved by visible letters. In almost all cases, the engraving area is recorded within an angle of less than 180° and other area is still blank.

Figure 6:
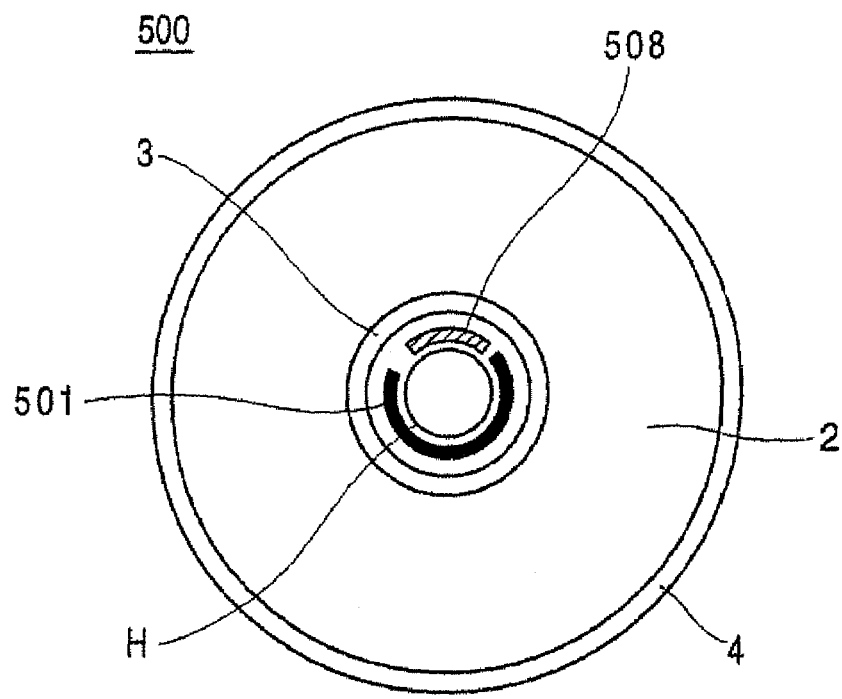
FIG. 6 shows an appearance of an information recording medium, which is recorded with an environmental load information in a neighboring area for engraving on a surface of information recording area, according to a fifth embodiment of the present invention.

FIG. 6 shows an appearance of an information recording medium, which is recorded with an environmental load information in a neighboring area for engraving on a surface of information recording area, according to a fifth embodiment of the present invention.

In FIG. 6, an optical disk 500, in accordance with an aspect of the present information, comprises a center hole "H", an engraving area 508, a recording area 501 for environmental load information, a lead-in area 3, a main information area 2 and a lead-out area 4. They are allocated sequentially from an innermost area to an outermost circumference and form an information recording area totally. In the engraving area 508, a title number of the optical disk 500 and a stamper number are recorded in a circular arc by visible letters. However, in almost all cases, the engraving area 508 is recorded within an angle of less than 180° and other angle is kept blank. An environmental load information can be recorded in the blank angle or a blank space and the blank space can be assigned to the recording area 501 for environmental load information. Providing the recording area 501 for environmental load information does not interfere in a main information at all or not reduce a recording capacity of the main information area 2. Further, a facility utilized for the engraving area 508 can also be utilized for recording an environmental load information in the recording area 501 for environmental load information, so that it is more efficient. In almost all cases, the engraving area 508 is formed by a method of cutting while manufacturing a stamper or by a punch pressing at a final step of manufacturing a stamper, so that a wide variation of formats can be recorded in the recording area 501 for environmental load information. A method of cutting being commonly utilized is a useful method, which can select either recording in a visible letter or recording in a format read out by a reproducing apparatus as a same method as for recording in the lead-in area 3.

Since an environmental load information is in smaller capacity than a main information, a coarser pattern can be applicable for a fine pattern. A pit pattern, for example, and one-dimensional or two-dimensional bar code pattern such as the QR code, which is defined by the Japanese Industrial Standard JIS-X0510, can also be acceptable. Further, a still picture, a moving picture or a letter formed by a hologram can also be acceptable. A form of a pattern is not limited to a line; it is acceptable to be formed in a circular arc. Particularly, recording by a visible letter is easy to recognize, so that it is a desirable method of recording. In a case that a font size is more-than 0.5 mm square, preferably more than 1 mm square, further preferably more than 2 mm, it can be recognized without utilizing an inherent reproducing apparatus although a pattern can be read out by a CCD (Charge Coupled Device) or like. Accordingly, such a recording method by a visible letter is easy to handle by an end user or a treater of recycling.

If the recording area 501 for environmental load information is allocated to an area succeeding to a title number of a usual disk, in other words, if the recording area 501 for environmental load information is allocated approximately within a same radius as the engraving area 508 and allocated not to coincide with each other, better visibility of an environmental load information is ensured and it can be efficiently utilized. For example, the engraving area 508 is allocated to a 60° circular arc area and a disk title and a stamper number are recorded in the 60° circular arc area. On the other hand, the recording area 501 for environmental load information is allocated to a 30° circular arc area and some information selected out of a name of main component, an IFPI number as a code number of disk manufacturer, a device number utilized for mastering, a device number utilized for molding and a country of manufacturing are recorded in the 30° circular arc area. In addition thereto, the recording area 501 for environmental load information shall be allocated not so as to obstruct to read out signals recorded in the lead-in area 3. For example, the recording area 501 shall be allocated in arbitrary radius within a radius of 16.5 through 22.6 mm, particularly 18.0 through 22.5 mm, further preferably 20.0 through 22.0 mm. The recording area 501 shall be backed up by the recording layer 12 and visibility of an environmental load information shall be increased.

Further, it is desired for the environmental load information recorded on the recording area 501 for environmental load information that letters or characters of the environmental load information can be read normally with observing from the reading out surface 7 of the optical disk 500. Furthermore, the recording area 501 shall be allocated not to superimpose on a stuck rib, which is a ring shaped projection provided on the reading out surface 7 not so as to contact with other object, for better visibility. In the fifth embodiment of the present invention, the engraving area 508 and the recording area 501 for environmental load information are assigned in the areas of 60° and 30° respectively. However, the other area is still blank. For example, a 30°, of the blank area can be reserved for a future use. In other words, the optical disk 500 shown in FIG. 6 is such an information recording medium of comprising the main information area 2 provided as an information recording area for recording and/or reproducing the information, the engraving area 508, which is allocated outside the inner circumference of the main information area 2 and in a circular arc of a predetermined radius and recorded with an inherent information such as a title number of the optical disk 500 as an identification information recording area and the recording area 501 for environmental load information, which is allocated in the same circular arc mentioned above but not superimposed on the engraving area 508 and recorded with an environmental load information related to the optical disk 500 itself.

Sixth Embodiment

This embodiment depicts that an environmental load information is recorded on a surface of the reading out surface 7 opposite to the information recording surface 6 shown in FIG. 2.

Figure 7:
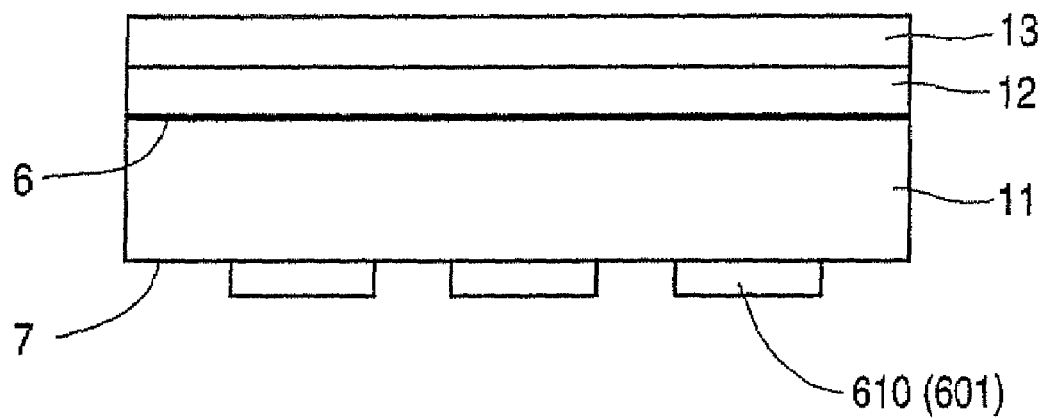
FIG. 7 is a sectional view of an optical disk, which is formed with an area recorded with an environmental load information, according to a sixth embodiment of the present invention.

FIG. 7 is a sectional view of an optical disk, which is formed with an area recorded with an environmental load information on the reading out surface, according to a sixth embodiment of the present invention. In FIG. 7, an optical disk 600 comprises an information recording surface 6, a reading out surface 7, a substrate 11, a recording layer 12, a protection layer 13 and a recording area 601 for environmental load information, which is recorded by a fine pattern of a second recording layer 610 readably. FIG. 7 depicts an example that an environmental load information is recorded by the second recording layer 610 whether or not it exists.

Since an environmental load information is in a smaller capacity than a main information, a rather coarse pattern can be applied for a fine pattern for the environmental load information. Accordingly, a wide variation of formats can be recorded. For example, a pit pattern and one-dimensional or two-dimensional bar code pattern such as the QR code can be acceptable. Further, a letter, a character, or a Braille point can also be acceptable. Furthermore, a still picture, a moving picture or a letter formed by a hologram can be acceptable. A form of a pattern is not limited to a line; it is acceptable to be formed in a circular arc. The recording area 601 for environmental load information shall be allocated in either or both of the innermost and the outermost circumference areas not so as to obstruct reading out signals recorded on the information recording surface 6.

The recording area 601 for environmental load information can be allocated throughout the reading out surface 7. In this case, a material of the second recording layer 610 shall have a characteristic of light transparency so as to substantially transilluminate at least a reproduction wave length of a main signal.

Since it is essential that the recording area 601 for environmental load information shall be recognized by an end user and treaters of recycling and disposing and further, the recording area 601 is not necessary to rewrite, a wide range of methods such as a light, magnetism, an electrostatic capacitance and an electric resistance can be utilized for reading out the environmental load information. A material utilized for the second recording layer 610 can be selected by a reading out method. For example, in a case of reading out by an optical method, a metal thin film and a coloring matter thin film are a best material for the second recording layer 610. Particularly, a material having a high degree of reflection such as gold, silver, aluminum, an alloy including them and a resin composite, which is composed of a pigment having a high luminous contrast such as titania, silica and carbon and a dye such as anthraquinone family, azo family and perylene family, are suitable for the second recording layer 610.

In a case of reading out by a magnetic method, a magnetic thin film composed of iron, cobalt and their alloy are suitable for the second recording layer 610. In a case of reading out by an electrostatic capacitance and an electric resistance, a conductive thin film such as copper, tin, lead, aluminum and their alloy are suitable for the second recording layer 610. In addition thereto, these materials can be utilized for the second recording layer 610 as a multilayer of the materials as well as utilized individually. With respect to a material of transilluminating a reproducing wave length of a main signal substantially, in a case of reading out by an optical method, a resin composite including anthraquinone and perylene dye can be utilized for the second recording layer 610. In a case of reading out by a magnetic method, a resin composite including a barium-ferrite magnetic material can be utilized for the second recording layer 610. In a case of reading out by an electrostatic capacitance or an electric resistance, tin-indium oxide can be utilized for the second recording layer 610.

In order to form the second recording layer 610, a material mentioned above can be processed by a method of press coating, spray coating, adhering, liquid phase filming such as an electroless plating, vacuum filming such as evaporation, sputtering and plasma CVD (chemical vapor deposition) and high pressure filming such as high pressure CVD by means of a mask, which is formed by stamping out an environmental load information. After forming the second recording layer 610, a thermosetting process, if necessary, can be applied by baking, an infrared ray lamp, a flush lamp, an ultraviolet lamp and an electron beam radiation.

Seventh Embodiment

In the above-mentioned methods of forming the second recording layer 610, there exist the press coating method by means of a mask formed by stamping out an environmental load information.

Figure 8:
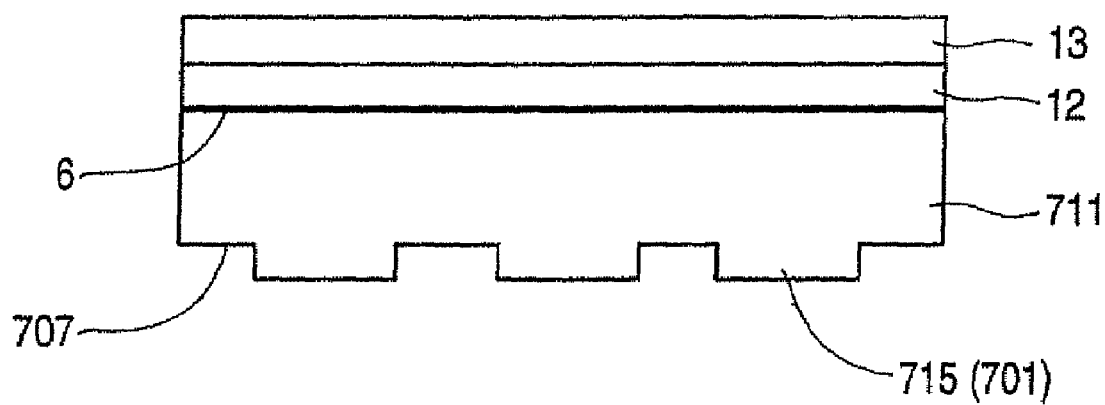
FIG. 8 is a sectional view of an information recording medium, which is recorded with an environmental load information in parallel to an area for engraving on a surface of reading area, according to a seventh embodiment of the present invention.

FIG. 8 is a sectional view of an information recording medium, which is recorded with an environmental load information in parallel to an area for engraving on a surface of reading area, according to a seventh embodiment of the present invention. In FIG. 8, an optical disk 700 comprises a substrate 711, a recording layer 12, a protection layer 13, an information recording surface 6, a reading out surface 707 and a recording area 701 for environmental load information, wherein an environmental load information 715 is formed in conjunction with the substrate 711. The environmental load information 715 is engraved on a mold and the substrate 711 is formed by utilizing the mold by means of a method such as an injection molding and a compression molding. Accordingly, the environmental load information 715 can be formed in conjunction with forming the substrate 711. It is a most efficient forming method that a material of the environmental load information 715 is the same as that of the substrate 711. As an example of an environmental load information, some information selected out of a name of main component, an IFPI number as a code number of disk manufacturer, a device number utilized for mastering, a device number utilized for molding and a country of manufacturing are recorded. However, an information, which can be engraved on a mold, is restricted, so that the information is limited particularly to be selected out of the name of main component, the IFPI number and the device number utilized for molding. In a case that a font size is more than 0.5 mm square, preferably more than 1 mm square, further preferably more than 2 mm, it can be recognized without utilizing an inherent reproducing apparatus. Accordingly, such a recording method by a visible letter is easy to handle by an end user or a treater of recycling. Further, the environmental load information 715 shall be allocated not so as to obstruct to read out signals recorded in the lead-in area 3. For example, the recording area 701 shall be allocated in arbitrary radius within a radius of 16.5 through 22.6 mm, particularly 18.0 through 22.5 mm, further preferably 20.0 through 22.0 mm.

Furthermore, it is desired for the environmental load information recorded on the recording area 701 that letters or characters of the environmental load information can be read normally, with observing form the reading out surface 7 of the optical disk 700. In addition thereto, the environmental load information 715 can be allocated in a circular arc or in line such a bar code on a circumference. In a case that the environmental load information 715 is formed in conjunction with the recording area 501 for environmental load information, which is formed on an extension of the engraving area 508 shown in FIG. 6, these areas shall be allocated in different angles not so as to overlap each other.

Eighth Embodiment

Figure 9:
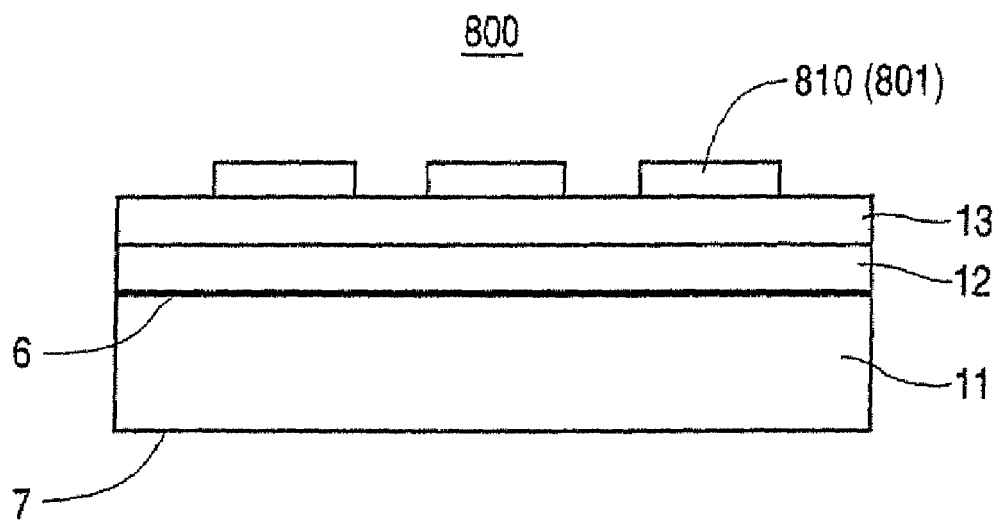
FIG. 9 is a sectional view of an optical disk, which is formed with an area recorded with an environmental load information, according to an eighth embodiment of the present invention.

FIG. 9 is a sectional view of an optical disk 800, wherein a recording area 801 for environmental load information is formed directly on the protection layer 13, according to an eighth embodiment of the present invention. In FIG. 9, all reference numbers except 801 and 810 are the same as mentioned above. An environmental load information is recorded by a fine pattern in a readable second recording layer 810 and recorded by whether or not the second recording layer 810 exists. With respect to a pattern, a same shape, material and reading out method as shown in FIG. 7 can be utilized. However, it is a most major feature that the pattern can be arbitrarily allocated throughout the protection layer 13.

Since an environmental load information is in a smaller capacity, other functions can be contained in a plain of an optical disk. For example, a title of contents and a logo of soft distributor can be formed on the plain of the optical disk.

Figure 10:
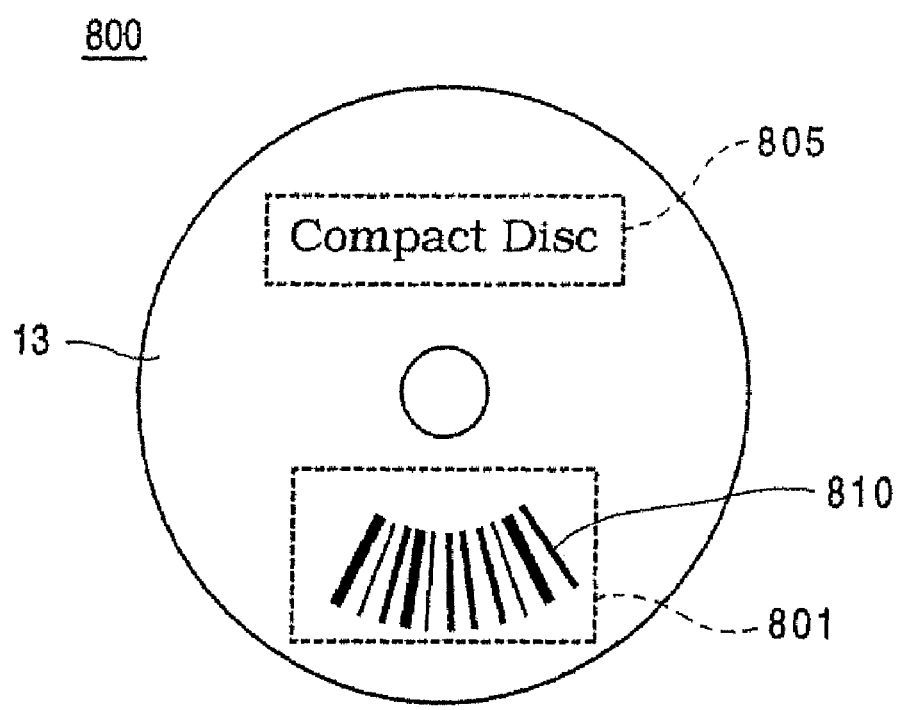
FIG. 10 shows an appearance of an optical disk having a sectional configuration shown in FIG. 9 as an information recording medium according to the eighth embodiment of the present invention.

FIG. 10 shows a plan view of a CD disk, which is applied as the optical disk 800 shown in FIG. 9, with viewing from the protection layer 13 on which the recording area 801 is allocated.

In FIG. 10, the optical disk 800 comprises the recording area 801 for environmental load information, which is composed of the second recording layer 810 and an area 805 for displaying a title of contents. The recording area 801 and the area 805 can be existed on a same surface of the protection layer 13. In addition thereto, a one-dimensional bar code, which is allocated in a circular arc in the radial direction of the optical disk 800, is formed by the second recording layer 810. An optical head or a CCD can read a pattern of the one-dimensional bar code.

Ninth Embodiment

Figure 11:
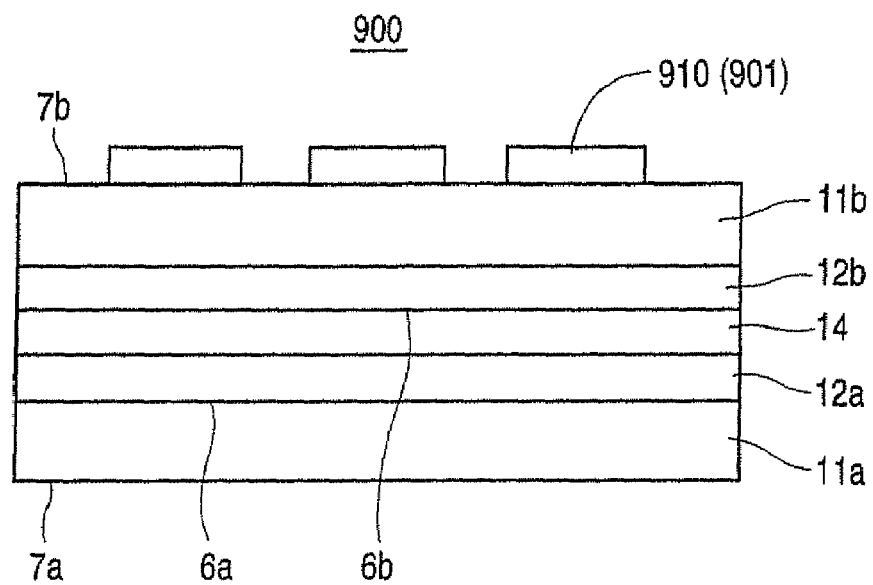
FIG. 11 is a sectional view of an optical disk, which is formed with an area recorded with an environmental load information, according to a ninth embodiment of the present invention.

FIG. 11 is a sectional view of an optical disk 900 having a configuration of sticking together, according to a ninth embodiment of the present invention. In FIG. 11, the optical disk 900 comprises a first substrate 11a, a first recording layer 12a, a bonding layer 14, a second recording layer 12b, a second substrate 11b, a first information recording surface 6a, a second information recording surface 6b, a reading out surface 7a and an opposite surface 7b to the reading out surface 7a, and further a recording area 901 for environmental load information is directly formed on the opposite surface 7b of the second substrate 11b, wherein the recording area 901 is composed of a third recording layer 910. The optical disk 900 is an example of a single side reading out type dual layer disk having two reading out surfaces 6a and 6b, which are read out from the reading out surface 7a. With respect to a pattern, a same shape, material and reading out method as shown in FIGS. 7 and 9 can be utilized. However, it is a most major feature that the pattern can be arbitrarily allocated throughout the opposite surface 7b.

Figure 12:
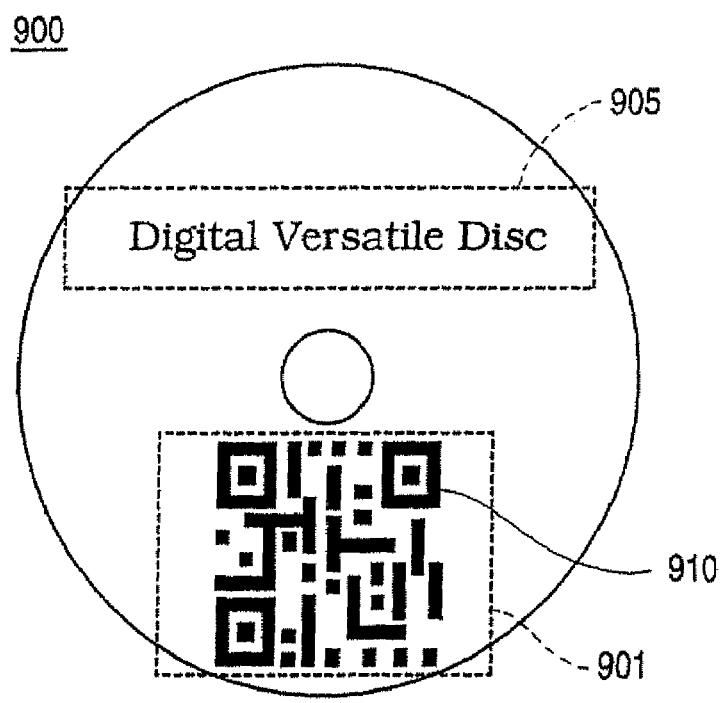
FIG. 12 shows an appearance of an optical disk having a sectional configuration shown in FIG. 11 as an information recording medium according to the ninth embodiment of the present invention.

FIG. 12 shows a plan view of a DVD dual layer disk, which is applied as the optical disk 900 shown in FIG. 11, with viewing from the opposite surface 7b on which the recording area 901 is allocated. In FIG. 12, the optical disk 900 comprises the recording area 901 composed of the third recording layer 910 and an area 905 for displaying a title of contents. The recording area 901 and the area 905 are allocated on a same plain. An environmental load information is recorded as a linear two-dimensional bar code. An optical head or a CCD can read out the two-dimensional bar code. Particularly, the bar code is linear, so that a bar code reader can read out the bar code without rotating the optical disk 900. Accordingly, the optical disk 900 is convenient for a treater of recycling or disposing.

Tenth Embodiment

Figure 13:
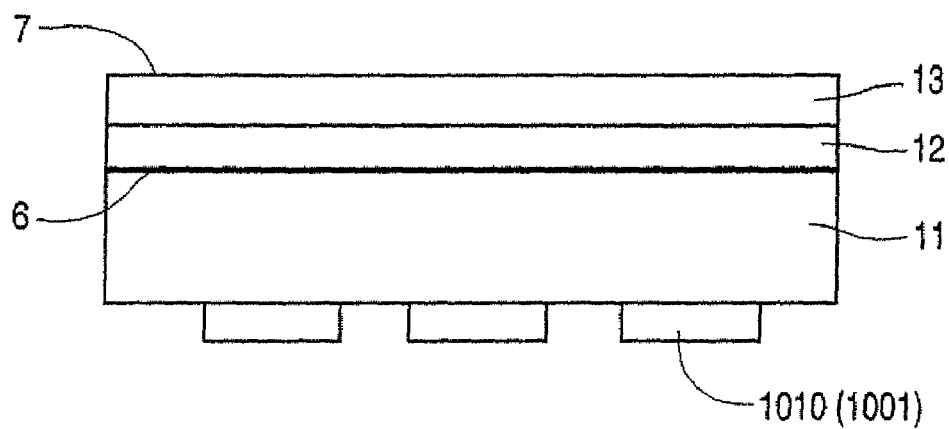
FIG. 13 is a sectional view of an optical disk, which is formed with an area recorded with an environmental load information, according to a tenth embodiment of the present invention.

FIG. 13 is a sectional view of an optical disk 1000, which is a different configuration from the optical disks shown in FIGS. 7 and 9, according to a tenth embodiment of the present invention. In FIG. 13, the optical disk 1000 comprising the substrate 11, the recording layer 12 and the protection layer 13 is the same configuration as that of shown in FIG. 7. However, the reading out surface 7 is allocated on the protection layer 13. Further, a recording area 1001 for environmental load information is composed of a second recording layer 1010 and formed directly on the substrate 11. With respect to a pattern, a same shape, material and reading out method as shown in FIGS. 7, 9 and 11 can be utilized. However, it is a most major feature that the pattern can be arbitrarily allocated throughout an outer surface of the substrate 11.

Figure 14:
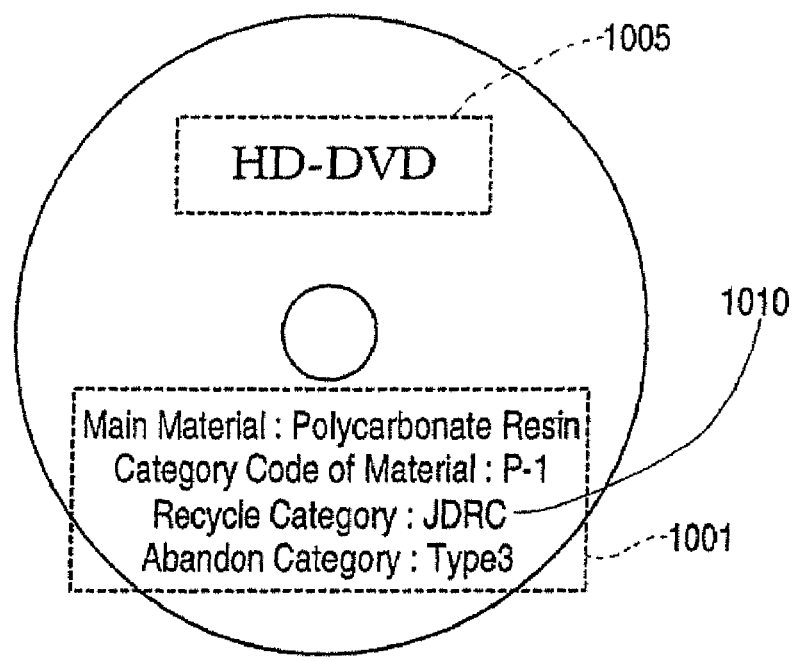
FIG. 14 shows an appearance of an optical disk having a sectional configuration shown in FIG. 13 as an information recording medium according to the tenth embodiment of the present invention.

FIG. 14 shows a plan view of a high density optical disk 1000, which is reproduced by a light having a wave length of 350 to 550 nm, with viewing from the protection layer 7 on which the recording area 1001 is allocated. In FIG. 14, the optical disk 1000 comprises the recording area 1001 composed of the second recording layer 1010 and an area 1005 for displaying a title of contents. The recording area 1001 and the area 1005 are allocated on a same plain. An environmental load information is recorded as a letter pattern. The pattern can be read out by a CCD, which is one optical reading out device. Further, the pattern can be read out by a human's eye with depending upon a font size. In a case that a font size is more than 0.5 mm square, preferably more than 1 mm square, further preferably more than 2 mm, it can be recognized without utilizing an inherent reproducing apparatus. Accordingly, such a recording method by a visible letter is easy to handle by an end user or a treater of recycling or disposing.

The environmental load information shown in FIG. 14 is written in English. However, any languages can be applicable.

The recording methods of recording an environmental load information on the optical disk disclosed in the sixth through tenth embodiment are that the environmental load information is recorded on another surface than the information recording surface 6. An advantage of the recording method is that a signal recording method of main signal or main information is not necessary to change or a reproduction capacity of disk is not necessary to reduce at all.

Eleventh Embodiment

As mentioned above, the present invention can be applied to a recording/reproducing type optical disk such as a MD disk, a MO disk, an HS disk, a GIGAMO disk, an ASMO disk, a PD disk, a DVD-RAM disk, a DVD-RW disk and a DVD+RW disk. Almost all these disks are required to be contained in a cartridge. Further, some of these disks can be removed from a cartridge. An optical disk having a reading out surface provided on an outer surface of the protection layer 13 is still under development. However, such a disk can be contained in a cartridge. Furthermore, almost all magnetic disks must be contained in a cartridge.

Figure 15:
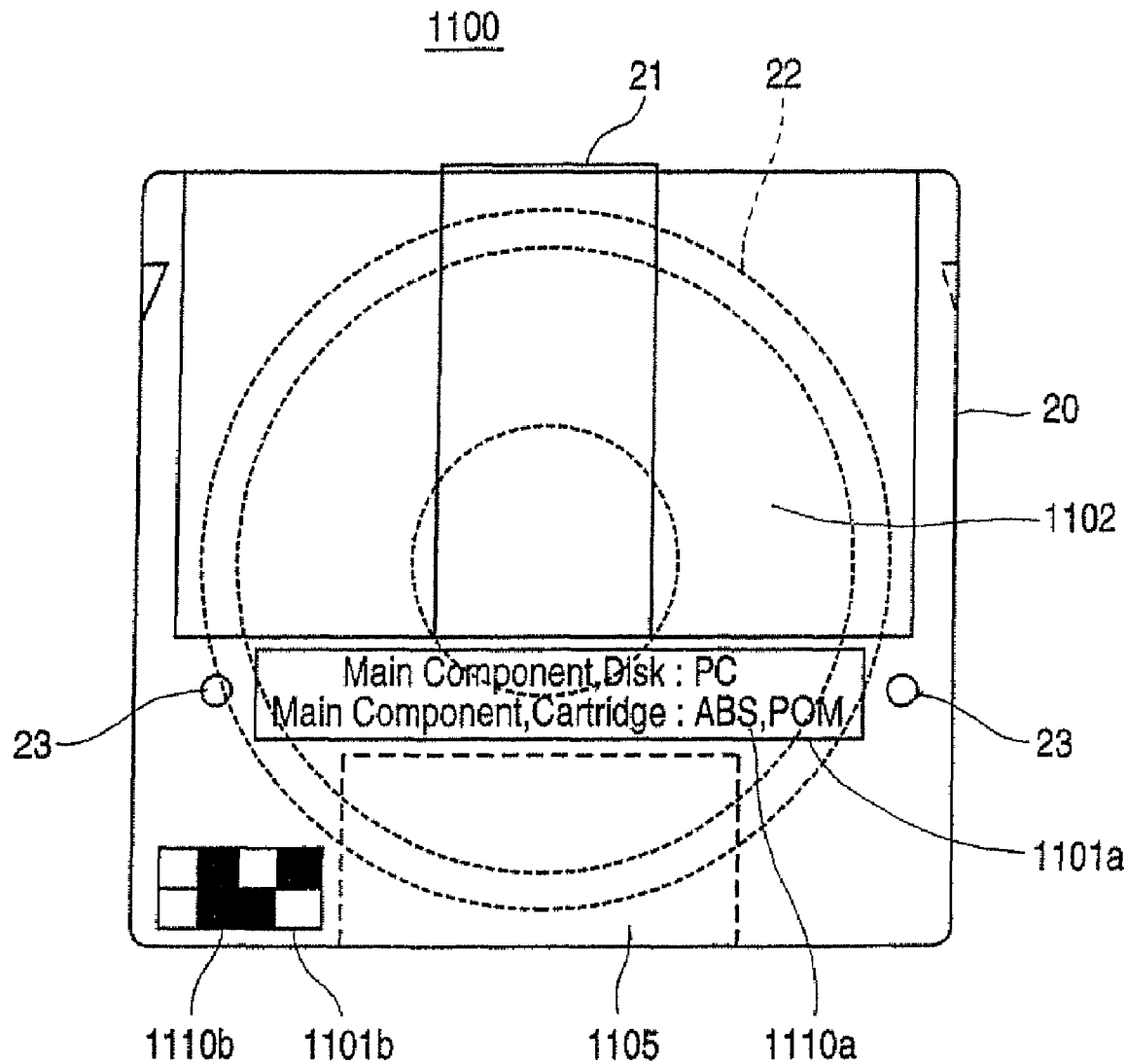
FIG. 15 shows an appearance of an optical disk with cartridge as an information recording medium according to an eleventh embodiment of the present invention.

FIG. 15 shows an appearance of an optical disk with cartridge as an information recording medium according to an eleventh embodiment of the present invention. In FIG. 15, an optical disk with cartridge 1100 comprises a cartridge housing 20, a shutter 21 and a recording/reproducing type disk 22, which is contained in the cartridge housing 20. The shutter 21 is engaged with the cartridge housing 20 and can move within a predetermined range. At least one surface of the disk 22 is provided as an information recording surface and a first area 1102 for recording/reproducing is provided on the information recording surface. Further, two holes 23 are provided on the cartridge housing 20 for locating the cartridge, discriminating a side "A" or "B" or discriminating whether or not the disk 22 exists. Furthermore, a second area 1105 for displaying a title of contents is provided on the cartridge housing 20.

As shown in FIG. 15, a first and a second recording areas 1101a and 1101b for environmental load information are provided on the cartridge housing 20. The first recording area 1101a is allocated in a vicinity of the holes 23 and the second recording area 1101b is allocated in a vicinity of the second area 1105. The first recording area 1110a is, for example, 90 mm long and 5 mm wide, and an environmental load information 1110a is recorded as a letter pattern by means of embossing a mold. Contents of the environmental load information 1110a are a material information related to the optical disk with cartridge 1100. Main materials of the cartridge housing 20, the shutter 21 and the built-in optical disk 22 are recorded as shown in FIG. 15. Accordingly, a CCD, which is one of optical reading out devices, can read out the material information such that the main component of the cartridge housing 20 is acrylonitrile-butadien-styrene (ABS) resin, the main component of the shutter 21 is polyacetal resin (POM) and the main component of the built-in optical disk 22 is polycarbonate resin (PC). In this case, a size of the environmental load information 1110a is rather large, so that an inherent reproducing apparatus is not necessary for reading out the information. By reading out the environmental load information 1110a by human's eye, recorded contents can be recognized with referring a comparison table of material and its abbreviation.

The second recording area 1101b is, for example, 15 mm square, and an environmental load information is recorded as a reflection type hologram 1110b. In this case, contents of the environmental load information are a recycling information or re-using information and an abandoning information, which are coded by a predetermined rule. The hologram 1110b looks like checks at a glance. However, a black square is composed of recording layers in grating, which generate a diffraction angle of 30° to the black square, and a white square is composed of recording layers in grating, which generate a diffraction angle of 60° to the white square. A treater of disposing can read out the coded environmental load information of the hologram 1110b by utilizing a reading apparatus by laser, which is one of optical methods.

Twelfth Embodiment

As mentioned above, the present invention can also be applied to a magnetic tape. Almost all magnetic tapes are essentially contained in a cartridge. Such a magnetic tape with cartridge is applied for videotape of the VHS (Video Home System) family such as a VHS tape, an S-VHS tape, a W-VHS tape and a D-VHS tape.

Figure 16:
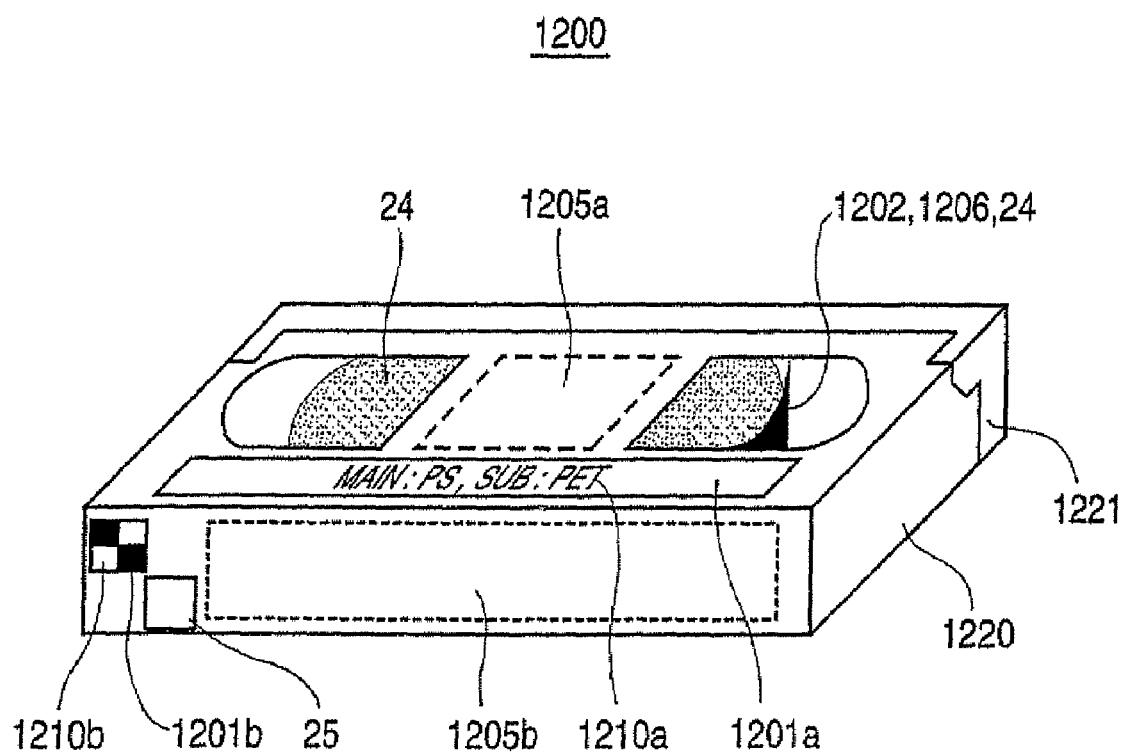
FIG. 16 shows an appearance of a magnetic tape built in a cartridge as an information recording medium according to a twelfth embodiment of the present invention.

FIG. 16 shows an appearance of a magnetic tape with cartridge 1200 as an information recording medium according to a twelfth embodiment of the present invention. In FIG. 16, the magnetic tape with cartridge 1200 comprises a cartridge housing 1220, a shutter 1221 and a recording/reproducing tape 24 built in the cartridge housing 1220. The shutter 1221 is engaged with the cartridge housing 1220 and can move within a predetermined range. At least one surface of the tape 24 is provided for an information recording surface 1206 and an area 1202 for recording/reproducing is provided on the information recording surface 1206.

Further, a hole 25 for preventing from accidental erasure is provided on the cartridge housing 1220. Furthermore, there provided a first area 1205a and a second area 1205b on the cartridge housing 1220, they are utilized for displaying a title of contents. As shown in FIG. 16, the first area 1205a is allocated on the top surface of the cartridge housing 1220 and the second area 1205b is allocated on the side of the cartridge housing 1220. Usually, a product name is described in the first area 1205a. However, an end user can describe a title of contents in the first area 1205a by attaching a sticker or like. The second area 1205b is provided for describing a title of contents by an end user. As shown in FIG. 16, a first and a second recording areas 1201a and 1201b for environmental load information are provided. The first recording area 1201a is allocated nearby the first area 1205a and the second area 1201b is allocated in a vicinity of the hole 25.

The first recording area 1201a is, for example, 160 mm long and 15 mm wide, and an environmental load information 1210a is recorded as a letter pattern by means of embossing a mold. Contents of the environmental load information 1210a are a material information related to the magnetic tape with cartridge 1200. Main materials of the cartridge housing 1220, the shutter 1221 and the built-in tape 24 are recorded as shown in FIG. 16. Accordingly, a CCD, which is one of optical reading out devices, can read out the material information such that the main component of the cartridge housing 1220 and the shutter 1221 is polystyrene (PS) resin and the main component of the tape 24 is polyethylene terephthalate (PET) resin. In this case, a size of the environmental load information 1210a is rather large, so that an inherent reproducing apparatus is not necessary for reading out the information. By reading out the environmental load information 1210a by human's eye, recorded contents can be recognized with referring a comparison table of material and its abbreviation.

The second recording area 1201b is, for example, 7 mm square, and an environmental load information is recorded as an embossment 1210b by means of embossing a mold. In this case, contents of the environmental load information recorded in the embossment 1210b are an abandoning information, which is patterned by a predetermined rule. The embossment 1210b looks like checks at a glance. However, for example, a black square is dented and a white square is projected. A treater of disposing can read-out the environmental load information of the embossment 1210b by utilizing a reading apparatus by electrostatic capacitance or a contact type electrode.

As mentioned in the above embodiments, information to be supplied to an end user and a treater of disposing can be different from each other. It is desired that information shall be recorded clearly and simply so as to eliminate unnecessary confusion. Further, it is desired that information shall be recorded by a plurality of methods in consideration of configurations of easier utilization by everyone.

Thirteenth Embodiment

Figure 19:
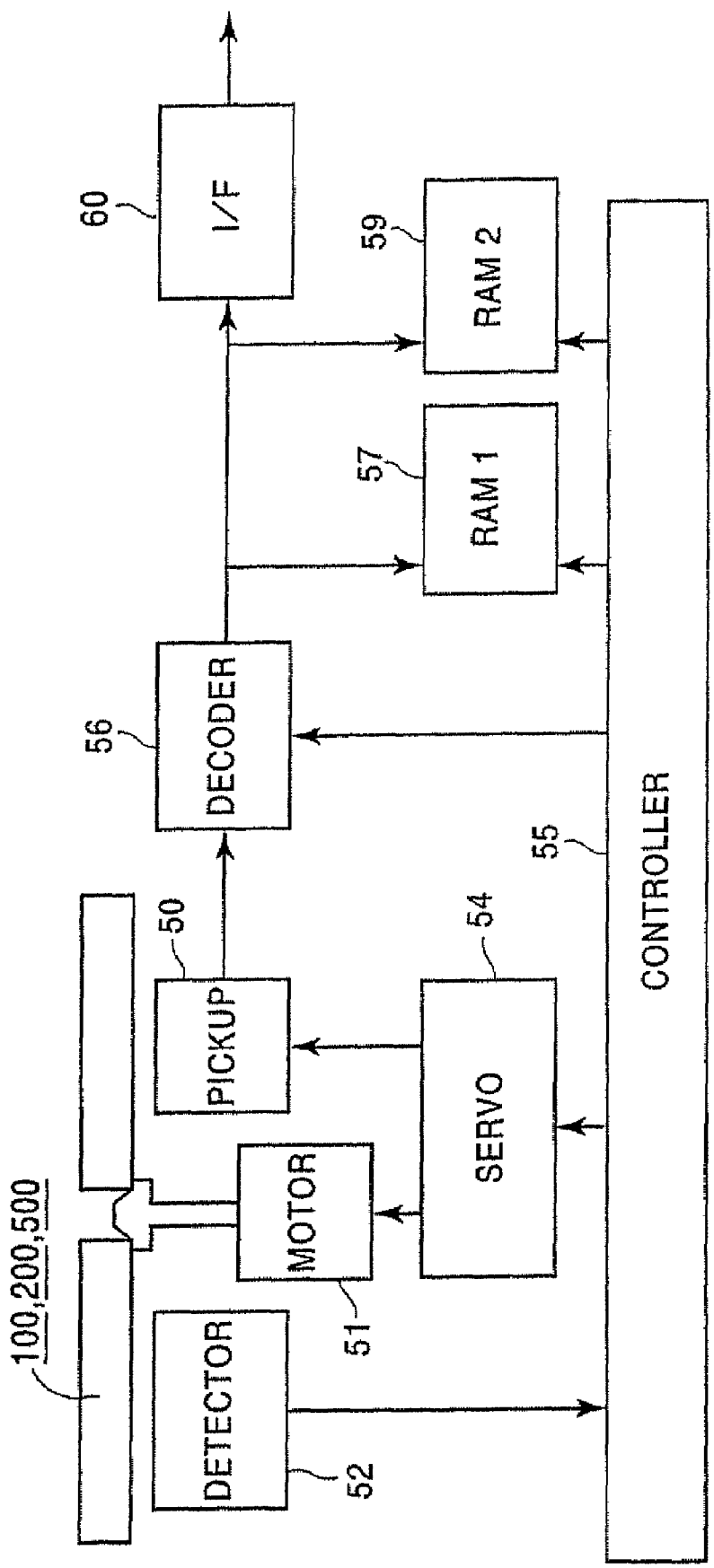
FIG. 19 shows a block diagram of a reproducing apparatus for an information recording medium according to a thirteenth embodiment of the present invention.

FIG. 19 shows a block diagram of a reproducing apparatus for an information recording medium according to a thirteenth embodiment of the present invention. The reproducing apparatus reads out an environmental load information recorded in an optical disk such as 100, 200, 500 shown in FIGS. 3, 4, and 6 respectively, of which the recording area for environmental load information is allocated in the information recording surface 6. In FIG. 19, the reproduction apparatus comprises a pickup 50, a motor 51, a detector 52 for a disk, a servo circuit (SERVO) 54, a controller 55, a decoder 56, a first random access memory (RAM 1) 57, a second random access memory (RAM 2) 59 and an interface (I/F) 60.

The detector 52 is a sensor of detecting whether or not a disk exists in the reproducing apparatus. The pickup 50 is an optical pickup, which irradiates the information recording surface 6 of the optical disk with laser and reads out a recorded signal by receiving reflected light, and then the read out signal is transferred to the decoder 56. Further, a focus error signal and a tracking error signal, which are based upon the reflected light, are transmitted to the servo circuit 54 although this signal flow is not shown in FIG. 19. The servo circuit 54 generates a focus servo signal and a tracking servo signal in response to a control by the controller 55 and sends these signals to the optical pickup 50. In the meantime, the servo circuit 54 also generates a rotation servo signal and transmits it to the motor 51. The decoder 56 decodes the signal read out by the pickup 50 and performs an error correction.

While decoding and correcting error, a timetable information at a time when a lead-in signal is read in and its related address number are stored in the "RAM 1" 57. With referring to the information stored in the "RAM 1" 57, the controller 55 reproduces an information allocated at a designated address number on a basis of user designated information. The reproduced information is transferred to the I/F 60 and outputted. An environmental load information can be obtained by reading out the recording area for environmental load information with the optical pickup 50 and stored in the "RAM 2" 59. The environmental load information stored in the "RAM 2" 59 is reproduced by an order of the controller 55 and transmitted to the I/F 60, and then outputted.

The reproducing apparatus shown in FIG. 19 is suitable for a case such that a main recording information and an environmental load information are composed of a similar format. It is a corresponding case; for example, that a main recording information is a movie recorded in the aspect ratio of 16:9 and an environmental load information is a short program produced by the EDTV (extended definition television) system in several minutes.

According to an aspect of the present invention, the reproducing apparatus can be applicable to a magnetic disk and a magnetic tape. In this case, the optical pickup 50 is replace with a magnetic head.

Fourteenth Embodiment

Figure 20:
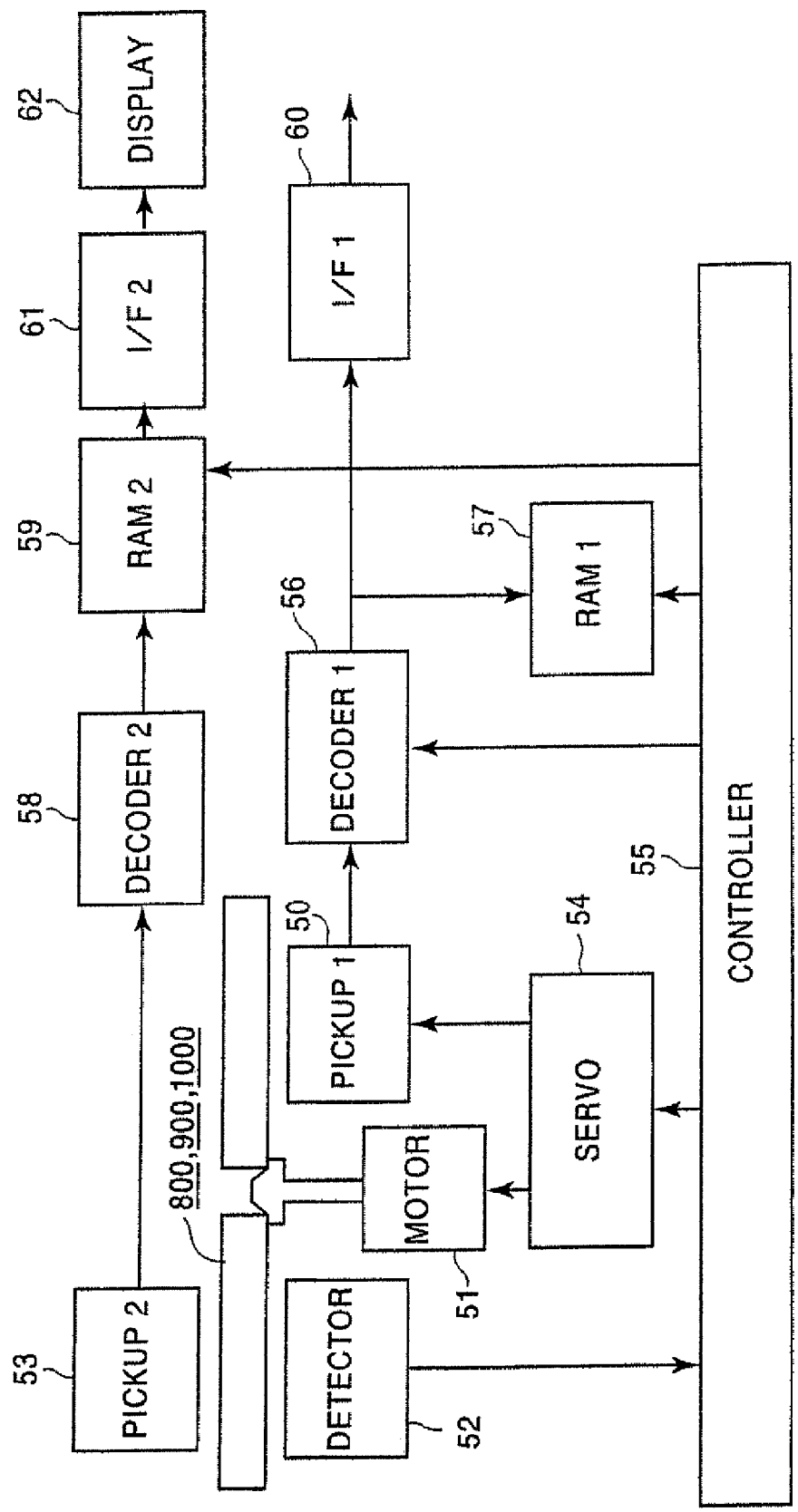
FIG. 20 shows a block diagram of a reproducing apparatus for an information recording medium according to a fourteenth embodiment of the present invention.

FIG. 20 shows a block diagram of another reproducing apparatus for an information recording medium according to a fourteenth embodiment of the present invention. The reproducing apparatus reads out an environmental load information recorded in an optical disk such as 800, 900 and 1000 shown in FIGS. 9 through 14 respectively, of which the recording area for environmental load information is allocated on the other surface than the information recording surface 6. In FIG. 20, the reproducing apparatus comprises a first pickup 50, a motor 51, a detector 52 for a disk, a second pickup 53 for reproducing an environmental load information, a servo circuit (SERVO) 54, a controller 55, a first decoder 56, a first random access memory (RAM 1) 57, a second decoder 58, a second random access memory (RAM 2) 59, a first interface (I/F 1) 60, a second interface (I/F 2) 61 and a display 62. The second pickup 53 is allocated nearby the recording area for environmental load information and can read out the information. The second pickup 53 is selected out from various heads such as an optical head, a CCD, a magnetic head, an electrostatic capacitance head and an electrode head.

An environmental load information can be read out at a same time when a main information is read out or read out individually. The controller 55 can direct the servo circuit 54, which is connected to the motor 51, in accordance with a reading out method of the environmental load information. The environmental load information read out by the pickup 53 is transmitted to the second decoder 58 and decoded properly and performed by an error correction, if necessary, and then stored in the "RAM 2" 59. The decoded environmental load information stored in the "RAM 2" 59 is reproduced by an order of the controller 55 and transferred to the "I/F 2" 61, and then outputted to the display 62. Various displaying methods such as a simplest indication by single or a plurality of LED (light emitting diode) lamps, a text display by a LCD (liquid crystal display) display, displaying a table format by a small monitor screen, an audio presentation by a speaker and a print indication by a printer or a plotter can be applicable for the display 62 and it can be selected in accordance with a format of environmental load information.

Other functions of the components except mentioned above are exactly the same as those of the reproduction apparatus shown in FIG. 19.

While the invention has been described above with reference to specific embodiments thereof, it is apparent that many changes, modifications and variations in the arrangement of equipment and devices and in materials can be made without departing from the invention concept disclosed herein. For example, the second pickup 53 shown in FIG. 20 is allocated opposite to the first pickup 50 with putting a disk between the pickups 50 and 53. However, the allocation is not limited the case shown in FIG. 20. In a case of the disks 600 shown in FIG. 7 and 700 shown in FIG. 8, the recording area 601 or 701 for environmental load information is allocated on the reading out surface 7 or 707 of the disk 600 or 700, so that the second pickup 53 can be allocated in the same side of the disk as the first pickup 50 is allocated.

Further, in accordance with the present invention, an environmental load information is recorded diffusely in a plurality of inherent areas, which are formed in the main information area. However, the environmental load information can be diffusely recorded in grooves or signal tracks, which are formed in the main information area.

Furthermore, each mechanism can be highly sophisticated in consideration of facilities for an end user, a treater of recycling and a treater of abandon.

In addition thereto, an optical disk is not limited only to a read only optical disk but also applicable to a recordable optical disk and further applicable to any other information recording mediums having similar configuration.

According to the aspect of the present invention, an environmental load information is previously recorded on an information recording medium, so that the medium can be properly disposed or recycled in accordance with the recorded environmental load information, which is read out by the reproducing apparatus of the present invention.

Accordingly, environmental conditions of the earth can be protected from possible pollution.

What is claimed:

1. An information recording medium comprising:
   a substrate;
   a recording layer formed on the substrate;
   a protective layer formed on the recording layer;
   a main information recording area provided for recording or reproducing main information; and
   a recording area for environmental load information recorded with environmental load information at least composed of material information related to said information recording medium,
   wherein said main information recording area and said recording area for environmental load information is formed without overlapping each other, and
   wherein said material information contains information that indicates a name of material utilized for at least one of the substrate, the protective layer and the recording layer.

2. The information recording medium in accordance with claim 1, wherein said environmental load information is recorded as a letter pattern.

3. The information recording medium in accordance with claim 1, wherein said material information contains information that indicates names of a plurality of materials.

4. A reproducing apparatus for reproducing an information recording medium comprising:
   a main information recording area provided for recording or reproducing main information; and
   a recording area for environmental load information recorded with environmental load information being at least composed of material information related to said information recording medium,
   said reproducing apparatus at least comprising:
   a reproducing means for reproducing said environment load information.

5. An information recording medium comprising:
   a main information recording area provided for recording or reproducing main information,
   wherein material information related to said information recording medium is recorded so as to be superimposed on said main information.

6. The information recording medium in accordance with claim 5, wherein said material information is composed of at least one of materials utilized for a substrate, a protective layer and a recording layer.

7. The information recording medium in accordance with claim 5, wherein said main information is recorded as an array of fine pits, and
   further wherein said material information is recorded by at least a period or an amplitude of a distorted sinusoidal wave form of said array of fine pits.

8. A reproducing apparatus for reproducing an information recording medium comprising:
   a main information recording area provided for recording or reproducing main information,
   wherein material information related to said information recording medium is recorded so as to be superimposed on said main information,
   said reproducing apparatus at least comprising:
   a reproducing means for reproducing said material information.

* * * * *